US011800295B2

(12) United States Patent
Kent

(10) Patent No.: US 11,800,295 B2
(45) Date of Patent: *Oct. 24, 2023

(54) ELECTROACOUSTIC TRANSDUCER

(71) Applicant: BAE SYSTEMS plc, London (GB)

(72) Inventor: Lionel William John Kent, Chelmsford (GB)

(73) Assignee: BAE SYSTEMS plc, London (GB)

( * ) Notice: Subject to any disclaimer, the term of this patent is extended or adjusted under 35 U.S.C. 154(b) by 42 days.

This patent is subject to a terminal disclaimer.

(21) Appl. No.: 16/631,719

(22) PCT Filed: Jul. 10, 2018

(86) PCT No.: PCT/GB2018/051957
§ 371 (c)(1),
(2) Date: Jan. 16, 2020

(87) PCT Pub. No.: WO2019/016515
PCT Pub. Date: Jan. 24, 2019

(65) Prior Publication Data
US 2020/0186936 A1 Jun. 11, 2020

(30) Foreign Application Priority Data

Jul. 19, 2017 (EP) ..................................... 17275112
Jul. 19, 2017 (GB) ..................................... 1711609
(Continued)

(51) Int. Cl.
*G01N 29/28* (2006.01)
*H04R 17/10* (2006.01)
(Continued)

(52) U.S. Cl.
CPC ........... *H04R 17/10* (2013.01); *B06B 1/0618* (2013.01); *B06B 1/0644* (2013.01); *G01N 29/28* (2013.01);
(Continued)

(58) Field of Classification Search
CPC ..... H04R 17/10; B06B 1/0618; B06B 1/0644; G01N 29/28; G01S 7/521; G10K 11/02; H04B 11/00
See application file for complete search history.

(56) References Cited

U.S. PATENT DOCUMENTS 2,906,993 A 9/1959 Steinberger
3,337,843 A * 8/1967 Kendig .................... G01S 1/72
367/158
(Continued)

FOREIGN PATENT DOCUMENTS

CN 103048330 A * 4/2013
CN 106650179 A 5/2017
(Continued)

OTHER PUBLICATIONS

International Search Report and Written Opinion received for PCT Application No. PCT/GB2018/051957, dated Dec. 21, 2018. 18 pages.
(Continued)

*Primary Examiner* — Isam A Alsomiri
*Assistant Examiner* — Abdallah Abulaban
(74) *Attorney, Agent, or Firm* — Finch & Maloney PLLC

(57) ABSTRACT

An electroacoustic transducer 400 is described. The electroacoustic transducer 400 comprises an active element 410. The electroacoustic transducer 400 comprises an acoustic coupling layer 430 arranged to acoustically couple, in use, the active element 410 to a transmission medium. The electroacoustic transducer 400 further comprises a cavity 420 arranged between the active element 410 and the acoustic coupling layer 430 to receive a fluid. In this way, acoustic coupling of the electroacoustic transducer 400 and the transmission medium is improved.

22 Claims, 13 Drawing Sheets

(30) Foreign Application Priority Data

Aug. 25, 2017 (EP) ..................................... 17275128
Aug. 25, 2017 (GB) ..................................... 1713707

(51) Int. Cl.
| | |
|---|---|
| *B06B 1/06* | (2006.01) |
| *G01S 7/521* | (2006.01) |
| *G10K 11/00* | (2006.01) |
| *G10K 11/02* | (2006.01) |
| *H04B 11/00* | (2006.01) |
| *H04B 1/40* | (2015.01) |
| *H04L 27/00* | (2006.01) |
| *H04R 17/00* | (2006.01) |
| *H10N 30/00* | (2023.01) |

(52) U.S. Cl.
CPC ............ *G01S 7/521* (2013.01); *G10K 11/002* (2013.01); *G10K 11/02* (2013.01); *H04B 1/40* (2013.01); *H04B 11/00* (2013.01); *H04L 27/0002* (2013.01); *H04R 17/00* (2013.01); *H10N 30/00* (2023.02); *B06B 2201/55* (2013.01); *G01N 2291/0231* (2013.01)

(56) References Cited

U.S. PATENT DOCUMENTS

| | | | |
|---|---|---|---|
| 3,891,871 | A | 6/1975 | Henriquez et al. |
| 3,946,599 | A | 3/1976 | Patt |
| 4,033,178 | A | 7/1977 | Holt et al. |
| 4,246,791 | A | 1/1981 | Glenn |
| 4,545,385 | A | 10/1985 | Pirschel |
| 4,565,096 | A | 1/1986 | Knecht |
| 4,672,591 | A | 6/1987 | Breimesser et al. |
| 4,982,385 | A * | 1/1991 | Eynck .................. G10K 11/205 367/176 |
| 5,052,393 | A | 10/1991 | Greenstein |
| 5,494,038 | A | 2/1996 | Wang et al. |
| 5,648,941 | A * | 7/1997 | King ..................... B06B 1/0681 367/176 |
| 5,770,801 | A | 6/1998 | Wang et al. |
| 6,155,982 | A | 12/2000 | Hunt |
| 6,617,765 | B1 | 9/2003 | Lagier et al. |
| 6,690,620 | B1 | 2/2004 | Mapes |
| 6,758,094 | B2 | 7/2004 | Miller |
| 7,719,170 | B1 * | 5/2010 | Kim ...................... H10N 30/06 310/335 |
| 9,050,053 | B2 | 6/2015 | Morgan |
| 9,121,817 | B1 * | 9/2015 | Roach ................... G01N 29/28 |
| 9,308,554 | B2 * | 4/2016 | Campbell ............. B06B 1/0614 |
| 2004/0025576 | A1 | 2/2004 | Glauser et al. |
| 2006/0043843 | A1 * | 3/2006 | Sugiura ................. G01S 7/521 310/348 |
| 2007/0175282 | A1 | 8/2007 | Fetzer et al. |
| 2009/0071253 | A1 | 3/2009 | Olsen et al. |
| 2011/0255375 | A1 * | 10/2011 | Mosca .................. B06B 1/0618 367/157 |
| 2012/0163126 | A1 | 6/2012 | Campbell et al. |
| 2012/0194973 | A1 * | 8/2012 | Baliga .................. B06B 1/0618 361/679.01 |
| 2013/0030727 | A1 | 1/2013 | Zalameda et al. |
| 2013/0160533 | A1 | 6/2013 | Gruca, Jr. et al. |
| 2013/0315037 | A1 * | 11/2013 | Mosca .................. B06B 1/0618 367/159 |
| 2014/0254325 | A1 | 9/2014 | Korbler et al. |
| 2015/0000408 | A1 | 1/2015 | Turner et al. |
| 2016/0274067 | A1 * | 9/2016 | Walker ................. G01N 29/036 |
| 2018/0043285 | A1 | 2/2018 | Gagnon et al. |
| 2019/0060954 | A1 * | 2/2019 | Mosca .................. G10K 15/04 |
| 2020/0186936 | A1 | 6/2020 | Kent |

FOREIGN PATENT DOCUMENTS

| | | |
|---|---|---|
| EP | 0031614 A1 | 7/1981 |
| KR | 20160008280 A | 1/2016 |
| WO | 2019016514 A1 | 1/2019 |
| WO | 2019016515 A1 | 1/2019 |

OTHER PUBLICATIONS

Invitation to Pay Additional Fees and, Where Applicable, Protest Fee, and Annex to Form PCT/ISA/206 received for PCT Application No. PCT/GB2018/051957. Mail date: Oct. 31, 2018. 11 pages.
Extended European Search Report received for EP Application No. 17275128.1, dated Jun. 15, 2018. 7 pages.
GB Search Report under Section 17(5) received for GB Application No: 1713707.6, dated Feb. 20, 2018. 5 pages.
GB Search Report under Section 17(6) received for GB Application No: 1713707.6, dated Aug. 17, 2018. 2 pages.
Li, et al., "Broadband gradient impedance matching using an acoustic metamaterial for ultrasonic transducers," Scientific Reports, Published Feb. 17, 2017. 9 pages.
Fletcher, Neville, H. and Thwaites, Suzanne, "Multi-horn matching plate for ultrasonic transducers," Ultrasonics, vol. 30., No. 2, 1992. pp. 67-75.
International Search Report and Written Opinion received for PCT Application No. PCT/GB2018/051956, dated Oct. 29, 2019. 12 pages.
Extended European Search Report received for EP Application No. 17275149.7, dated Jun. 21, 2018. 7 pages.
GB Search Report under Section 17(5) received for GB Application No. 1715467.5, dated Feb. 28, 2018. 4 pages.
International Preliminary Report on Patentability received for PCT Application No. PCT/GB2018/051957, dated Jan. 30, 2020. 11 pages.
International Preliminary Report on Patentability received for PCT Application No. PCT/GB2018/051956, dated Jan. 30, 2020. 7 pages.
United States Patent Office, Office Action issued in U.S. Appl. No. 16/631,721 (dated Nov. 23, 2022).

* cited by examiner

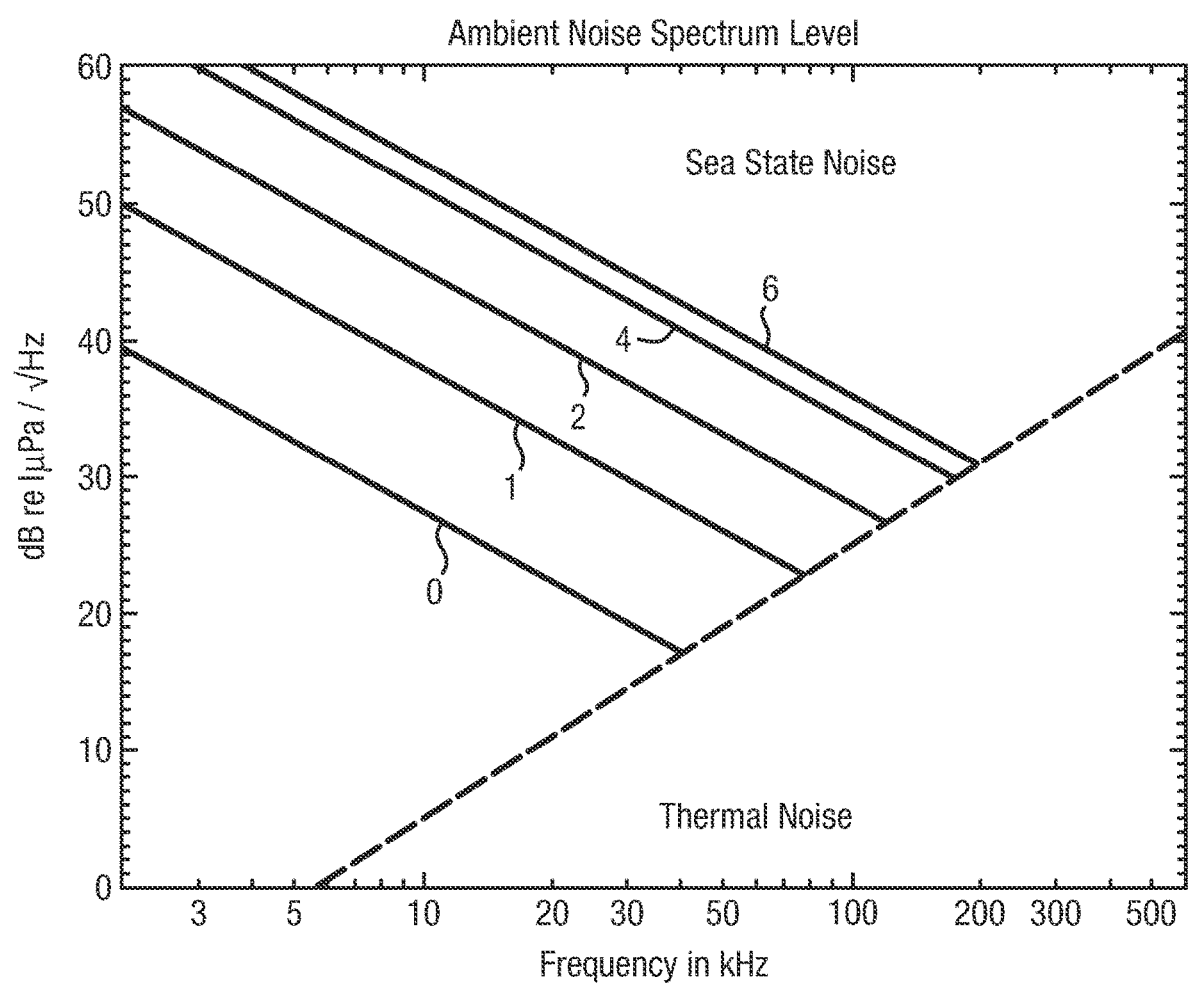

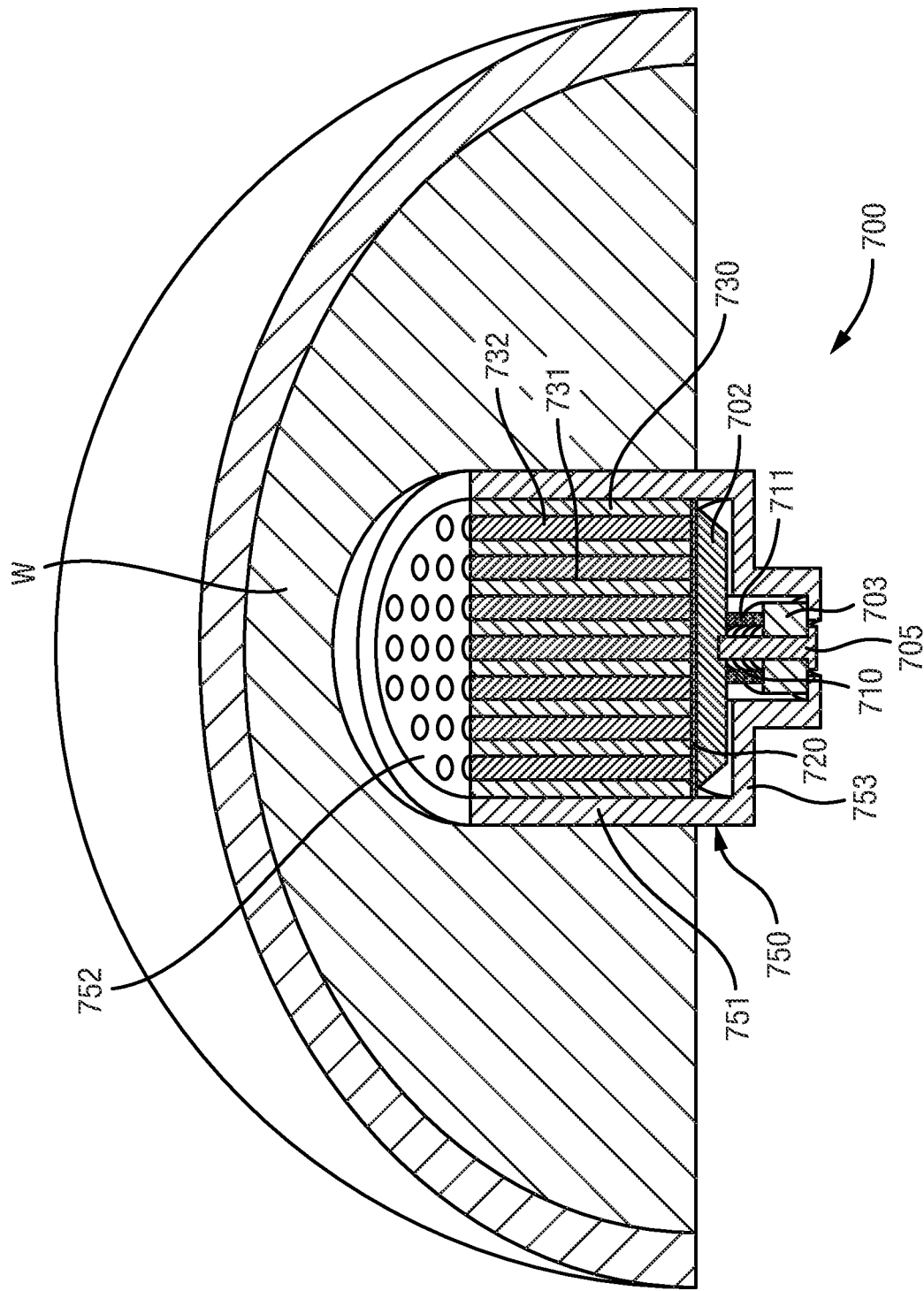

AMM

ELECTROACOUSTIC TRANSDUCER

FIELD

The present invention relates generally to electroacoustic transducers. More particularly, the present invention relates to electroacoustic transducers for acoustic transmission and/or reception through a transmission medium.

BACKGROUND TO THE INVENTION

Generally, electroacoustic transducers are used for transmitting and/or receiving acoustic signals. Such electroacoustic transducers may be used for example in scanners, tomography systems, sonar devices or for data and/or power transmission.

Coupling of sound from an active element of the electroacoustic transducer into the transmission medium may affect a mechanical Q of the electroacoustic transducer, resulting in reduced frequency bandwidth, reduced peak power and/or reduced range, for example. Hence, there is a need to improve electroacoustic transducers.

SUMMARY OF THE INVENTION

The example embodiments have been provided with a view to addressing at least some of the difficulties that are encountered with conventional electroacoustic transducers, whether those difficulties have been specifically mentioned above or will otherwise be appreciated from the discussion herein.

According to a first aspect, there is provided an electroacoustic transducer comprising:
an active element; and
an acoustic coupling layer arranged to acoustically couple, in use, the active element to a transmission medium;
wherein the electroacoustic transducer further comprises a cavity arranged between the active element and the acoustic coupling layer to receive a fluid;
whereby acoustic coupling of the electroacoustic transducer and the transmission medium is improved.

According to a second aspect, there is provided a Tonpilz transducer comprising:
an active element; and
an acoustic coupling layer arranged to acoustically couple, in use, the active element to a transmission medium;
wherein the acoustic coupling layer comprises an acoustic meta-material.

According to a third aspect, there is provided an array comprising a plurality of transducers according to the first aspect and/or the second aspect.

DETAILED DESCRIPTION OF THE INVENTION

According to the first aspect, there is provided an electroacoustic transducer comprising:
an active element; and
an acoustic coupling layer arranged to acoustically couple, in use, the active element to a transmission medium;
wherein the electroacoustic transducer further comprises a cavity arranged between the active element and the acoustic coupling layer to receive a fluid;
whereby acoustic coupling of the electroacoustic transducer and the transmission medium is improved.

It should be understood that the cavity mechanically and/or structurally isolates the acoustic coupling layer from the active element. That is, while the acoustic coupling layer improves acoustic coupling of the electroacoustic transducer and the transmission medium, a mass of the acoustic coupling layer does not significantly affect a mechanical Q of the transducer, since the mass of the acoustic coupling layer does not add to a mass of the active element, for example. The cavity comprising the fluid thus provides a buffer layer (also known as an acoustic intermediate layer). The acoustic coupling layer provides an anti-reflection structure.

In this way, coupling of sound from the resonating transducer structure (i.e. the active element) into the transmission medium may be improved so as to reduce the mechanical Q of the transducer. In this way, a centre operating frequency of the transducer may be reduced so as to increase range, while preserving high peak powers. Alternatively, the centre operating frequency of the transducer may be increased, for private and/or covert transmissions and/or communications at a decreased range, for example due to reduced losses within the vibrating transducer. In this way, transducer losses may be reduced, for example, at least in part due to the reduced mechanical Q.

In other words, an overall mechanical Q of the transducer may be reduced, thereby increasing a fractional bandwidth (i.e. widening the bandwidth). By increasing the fractional bandwidth, a lower centre frequency may be provided and/or an increased active sonar range and/or an increased transmitted power, for example peak power. In this way, the transducer may be arranged, for example located, outside of the transmission medium, for example on an opposed side of a wall from the transmission medium. For example, by arranging an acoustic meta-material, as described below, on an outside of a metal pressure hull of a submarine may permit the transducer to be arranged on the inside of the pressure hull, by virtue of the acoustic meta-material suppressing reflections on the outer metal-water interface. Additionally and/or alternatively, by increasing the fractional bandwidth, support of multiple sub-bands may be provided, for example to enable multiple targets, such as a real target and one or more decoy targets, to be tracked. For example, a plurality of such transducers may be grouped in a 2D transducer array and the transducer array may be used as or operate similarly to a phased array radar. Partitioning the fractional bandwidth into multiple, for example independent, sub-bands may allow separate targets to be tracked without signal interference between respective return signals from each target.

Benefits of Increased Frequency Bandwidth

Active acoustic sonar transducers suffer from low coupling efficiencies of the acoustic power from the transducer to the ocean. This reduces the peak acoustic power level that can be launched. This in turn limits the sonar range or increases the electrical power required to achieve the same range. In a small platform, such as a torpedo, power is limited, and the use of the propulsion system to generate power is undesirable due to the reduction of velocity and range.

A corresponding effect is the increase of the Q factor of the transducer, which limits the fractional bandwidth $\Delta f/fc$ of the transmitted signal. A reduced bandwidth widens the pulse width ($\sim 1/\Delta f$) of the transmitted pulse which limits range resolution.

Sonar seekers typically consist of 2D transducer arrays which operate in a manner similar to phased array radars.

Therefore like phased array radars, multiple targets could be tracked if the frequency bandwidth of the transducer can be made sufficiently wide. This could be achieved by partitioning the available bandwidth into sub-bands, one for each target, to prevent signal interference from different targets that are being simultaneously tracked.

Another option would be to enhance the post-digitised receiver signal to noise ratio by using swept-frequency signal digital processing techniques over wider frequency bands. The benefit of this approach is that it would reduce the probability of false alarms.

Current sonar systems have fractional frequency bandwidths Δf/fc that is much smaller than an octave, depending on the sonar type. A transducer structure with an inherently wider fractional bandwidth performance, could for the same overall frequency bandwidth, be designed to operate at a lower centre frequency. The benefit of reducing the centre frequency is that the acoustic attenuation losses in seawater of the sonar return signal from targets at long range will be considerably lower. Although the ambient sea state noise level increases as the operating frequency is reduced (FIG. 1) this noise issue is more than compensated by the reduction in acoustic attenuation from targets at extended ranges. Consider for example a 5 kHz bandwidth transducer. Reducing the centre frequency from say 40 kHz to 20 kHz will increase the average ambient sea state noise level of the sonar system by ~5 dB. However operating at the lower frequency would improve the returned signal from a target at 3 km range by ~41 dB for the same sonar array diameter. This large increase in received signal level relative to the ambient background sea-state noise would support a considerable increase in range. Generally, the signal noise level NL in units of dB is given by: NL=NSL+10 log Df–DI, where NSL is the Noise Spectrum Level; Df is the frequency bandwidth; and DI is the Directivity Index which is a measure of how directive the transmitted sonar beam is relative to a pure hemi spherically uniform illumination, again measured in units of dB. Generally, it would not be possible to increase the range by orders of magnitude despite the 41 dB number. Typically, the increase in range would be >=factor 2 because additional acoustic attenuation in the seawater at 20 kHz at the lower frequency of 21.6 dB for the additional 6 km of there and back path, giving a contribution 21.6 dB. In addition, the return signal for geometric beam spreading reasons will be reduced by 12 dB, giving a total 33.6 dB and thus offsetting in part the improvement benefit as the range increases further.

Therefore there is a strong driver to improve the coupling efficiency of the transducer to the water to improve range/power efficiency and range resolution performance.

This calculation may be similarly extended for other target ranges in reference to the impact of acoustic attenuation by using the acoustic attenuation data of Table 1, as shown below. With regard to range increases, if the range is doubled, then the received return echo for a given fixed frequency will be of the order of 12 dB lower due to the effect of diffraction spreading, and separately further additional losses due to acoustic attenuation over the increased range path.

Active Element

It should be understood that the active element generates and/or receives sound via a piezoelectric effect and/or an electromagnetic effect and/or an electrical effect, for example. In one example, the active element comprises a piezoelectric material, whereby sound is generated and/or received via the piezoelectric effect. In one example, the active element comprises a magnetostrictive material, whereby sound is generated and/or received via the electromagnetic effect. In one example, the active element comprises a conductive material, whereby sound is generated and/or received via the electromagnetic effect according to a Lorentz force. In one example, the active element comprises an electrostrictive material, whereby sound is generated and/or received via the electrical effect according to a Lorentz force. In one example, the active element comprises a plurality and/or a mixture of such materials. Preferably, the active element comprises a piezoelectric material.

Cavity

Bulk wave acoustic transducers are mechanically resonant structures, and good acoustic coupling between a resonating active element of the transducer, for example a resonating piezo-electric platelet of the transducer, and the acoustic medium (also known as a transmission medium) onto and/or into which it is interfaced, is required to support a wide signal frequency bandwidth response. This is a consequence of the well-known phenomena that the frequency bandwidth of a mechanical vibrating structure is a function of the mechanical Q of the structure, which is given by:

$$Q = \frac{f_r}{\Delta f} = 2\pi f_r \frac{\text{Energy stored}}{\text{Power Loss per cycle}} \tag{1}$$

Where $f_r$ is the natural resonant frequency of the structure, and $\Delta f$ is the frequency bandwidth (half power) of the structure.

A further practical constraint on the frequency bandwidth of an acoustic transducer is set by its electromechanical coupling coefficient. An example is the electromechanical coupling coefficient known in the art as '$k_t$', for example, associated with thin transducers whose cross-section is much wider than the thickness of the transducer. It is concerned with mechanical vibrations excited in the platelet thickness direction between electrodes on each end. This constant coefficient gives a measure of the coupling efficiency of the piezoelectric platelet for converting electrical power into mechanical power and vice versa. Another example is the electromechanical coupling coefficient known in the art as '$k_{33}$', associated with rod-like structures such as Tonpilz transducers, as an approximation.

The relationship between the mechanical Q of the transducer and therefore its fractional bandwidth $\Delta f/f_c$ 3 dB power points, and the electro-mechanical coupling constant $k_t$ is given by:

$$Q = \frac{f_c}{\Delta f} = \frac{\pi}{4k_t^2} \frac{z_T}{z_s} \tag{2}$$

where $f_c$ is the centre frequency of the transducer, $\Delta f$ is the frequency bandwidth (half power) of the transducer, $Z_T$ is the electrical input impedance of the transducer, and $Z_S$ is the source output impedance of the electrical power source.

The $k_t^2$ dependence is expected to apply for rod-like structures such as Tonpilz transducers, as an approximation. Hence, it may be beneficial to replace current high power PZT ceramic piezoelectric materials with a k of ~0.65 (Meggitts Pz189 grade PZT) with a single crystal of PMN-PZT which has a '$k_{33}$' of ~0.88 (for a higher temperature capable type). Hence, replacing a Pz189 grade PZT for a single crystal PMN-PZT would allow the fractional bandwidth of the transducer to be improved by a factor of $\sim(0.9/0.65)^2 \sim 1.83$. This would be a considerable improvement.

The acoustic impedance of a medium is defined to be the product of its density and acoustic velocity, and is a direct analogue of electrical impedance and has similar relationships. This implies that the acoustic impedance mismatch of the transducer should be made as low as possible relative to the medium into which acoustic waves are being launched.

As an illustrative example, consider a 36° Y cut lithium niobate transducer which has an electromechanical coupling constant $k_t$ of 0.487 for longitudinal acoustic wave generation. If the lithium niobate transducer is electrically tuned to be electrically perfectly matched to its electrical power source, i.e. $Z_T = Z_S$, then the expected fractional bandwidth for the transducer 3 dB power points, is only 30%. The energy stored in the system, and thus the Q of the structure, is minimised by increasing the power loss of the structure (i.e. mechanical damping). In other words, the Q of the structure is minimised by increasing coupling of power into the transmission medium.

The invention aims to provide an improved transducer with desirable fractional bandwidth characteristics.

The present innovation for increasing the bandwidth of a bulk acoustic wave transducer comprises arranging an acoustically thin intermediate layer, in this example a cavity arranged to receive a fluid, between the active element, for example the piezoelectric platelet, and the acoustic coupling layer and hence the main substrate (for example, the transmission medium) into which sound is being launched. An acoustically thin layer may be a layer of material having an acoustic thickness much less than the acoustic wavelength ($\Lambda$) in the medium in question. This is a surprising result. It is not an obvious outcome that a large increase in the matched bandwidth of the transducer can be achieved by adding an acoustically thin (e.g. semi-reflective) intermediate layer (i.e. the cavity), particularly if the acoustic impedance of the intermediate layer (i.e. the cavity) is either lower than, or alternatively larger than the acoustic impedances values of both active element, for example the piezoelectric layer, and the main substrate (for example, the transmission medium). The addition of such an intermediate layer (i.e. the cavity) to the transducer structure is particularly effective when the acoustic impedance of the piezoelectric layer is lower than that of the main substrate. It should be understood that a thickness of the acoustically thin intermediate layer (i.e. the cavity) is at least a displacement, in use, of the active element.

In use and/or at least in use, the cavity comprises the fluid, for example the cavity is at least partly filled with the fluid, for example completely filled with the fluid.

According to current wisdom in the art, such an intermediate layer (i.e. the cavity) should slightly impede the coupling of acoustic energy out of the active element (for example, the piezoelectric medium) into the bulk acoustic medium (i.e. the transmission medium). This is illustrated by the observation that the power reflection coefficient (R) of an acoustic wave incident at normal incidence to a boundary between two media of acoustic impedances $Z_1$ and $Z_2$ respectively, upon moving from medium 1 to medium 2, is given by:

$$R = \frac{(Z_2 - Z_1)^2}{(Z_1 + Z_2)^2} \tag{3}$$

The power transmission coefficient (T) of an acoustic wave incident at normal incidence to a boundary between the two media is given by:

$$T = \frac{4Z_1 Z_2}{(Z_1 + Z_2)^2} \tag{4}$$

Therefore the best acoustic coupling between the active element, for example the piezo-electric transducer, and the transmission medium would usually be achieved when the two media have nominally identical impedances. That is to say, the condition under which R=0 and T=1. Consequently one would expect a reduction in performance and in the frequency bandwidth of the transducer by introduction of the intermediate layer (i.e. the cavity). The opposite has been found. Note that one can ignore the impact on the total reflectivity, arising from the presence of any acoustically extremely thin bonding layers in the structure, and which may be optionally present in embodiments or aspects of the invention. The acoustic intermediate layer (i.e. the cavity) may also be referred to as a 'buffer layer'.

Current wisdom is based on the following considerations. When two adjacent media have a large acoustic impedance mismatch, for example $Z_1 \gg 2Z_2$ or alternatively $Z_2 \gg 2Z_1$, efficient coupling of acoustic waves between the two media can be facilitated by inserting at the interface between the two media a third medium, for example a homogeneous and/or an isotropic medium, with an acoustical thickness of $(2n+1)\Lambda/4$ where $\Lambda$ is the acoustic wavelength within the layer, and n is either 0 or a positive integer. The acoustic impedance $Z_i$ of the intermediate layer is then ideally selected to be:

$$Z_i = \sqrt{(Z_1 Z_2)} \tag{5}$$

The optimal thickness of $(2n+1)\Lambda/4$ is valid for an acoustic wave incident at normal incidence to the interface of the two main media. Under these circumstances, the acoustic impedance matching between the layers is optimal at the acoustic frequency where the thickness of the intermediate layer is equal exactly to an odd-integer multiple of one quarter of an acoustic wavelength. This may be appropriate for a conventional material. However, a different thickness may be preferred for acoustic meta-materials, as described below.

According to the 'impedance translation theorem', the combined power reflection coefficient $R_e$ of two closely spaced interfaces due to an intermediate layer of acoustic impedance $Z_3$ that is sandwiched between the two main acoustic media of acoustic impedance $Z_1$ and $Z_2$, is given by:

$$R = \frac{(Z_{layer} - Z_1)}{(Z_{layer} + Z_1)} \frac{\overline{(Z_{layer} - Z_1)}}{\overline{(Z_{layer} + Z_1)}} \tag{6}$$

Where the overhead bar represents the complex conjugate, and where $Z_{layer}$ is the effective acoustic impedance arising from the finite thickness of the intermediate layer and the termination impedance $Z_2$ behind it. Provided that the acoustic attenuation in the intermediate layer is small, the effective load acoustic impedance, $Z_{layer}$, arising from the intermediate layer (i.e. the cavity) is given by the expression:

$$Z_{layer} = Z_3 \left\{ \frac{Z_2\cos(k_{Layer}L) - iZ_3\sin(k_{Layer}L)}{Z_3\cos(k_{Layer}L) + iZ_2\sin(k_{Layer}L)} \right\} \quad (7)$$

And $k_{layer}$ is the acoustic k vector given by:

$$k_{layer} = \frac{2\pi}{\Lambda} = \frac{2\pi f_a}{V_a} \quad (8)$$

Where $\Lambda$ is the acoustic wavelength, $f_a$ is the frequency of the acoustic wave, and $V_a$ is the acoustic velocity.

Equation 6, containing the term $Z_{layer}$, must be used to describe the effect of the intermediate layer between the piezoelectric platelet and the main acoustic medium unless the intermediate layer (i.e. the cavity) is acoustically extremely thin; typically $<<\Lambda/10$ to $<\Lambda/100$ at the operational centre frequency. Equation 6 then reduces to the form of equation 3 as the thickness L of the intermediate layer (i.e. the cavity) tends to zero. The phase of the reflected acoustic wave from a material interface is dependent on the sign and value of the reflection coefficient r given by:

$$r = \frac{(Z_{layer} - Z_1)}{(Z_{layer} + Z_1)} \quad (9)$$

In the absence of an intermediate layer (i.e. the cavity) between a pair of media, the phase shift of the reflected acoustic wave relative to the incident acoustic wave is either 0° or 180°. If the incident acoustic wave is moving from a medium with low acoustic impedance to a medium with higher acoustic impedance, then the phase shift is 0°. A phase shift of 180° for the reflected acoustic wave occurs for the reverse case of the incident acoustic wave going from a high acoustic impedance medium into a low acoustic impedance medium.

Unlike the case of a simple interface between two media, the presence of an intermediate layer (i.e. the cavity) between two, for example a pair, of media yields a frequency dependent phase shift between the incident acoustic wave and the retro-reflected acoustic wave. This phase shift varies with frequency, and is a function of both the thickness of the buffer layer, and the acoustic impedances of the three materials making up the two interfaces. The phase shift of the reflected wave is determined by equation 9 which is a function of the complex variable parameter $Z_{layer}$.

Thus, the current wisdom in the art is that the presence of such an intermediate layer will add very significant complications to the optimal performance of the acoustic transducer, with no expectation of improving the bandwidth of the transducer in operation. The present invention contradicts current wisdom by demonstrating that significant enhancements can be made to the transmission bandwidth of an acoustic transducer when an intermediate (buffer) layer is added according to certain conditions.

Improvements in the fractional frequency bandwidth may be obtained/revealed due to an intermediate part (buffer layer) when the Smith Chart plot of the electrically impedance matched transducer's electrical response in the absence of a intermediate part does not yield a loop or kink in the Complex impedance response as plotted on the Smith Chart. The absence of a kink or loop in the Smith Chart plot may often occur, for example, when the acoustic impedance of the piezoelectric layer is either less than or alternatively equal to the acoustic impedance of the substrate. Significant improvements in the electrically matched bandwidth may be achieved when the addition of an intermediate part excites a kink, or better still a small loop, in the electrically matched transducer's Smith Chart response. Examples of this effect are for example illustrated in Figures herein and described below. The cavity is preferably acoustically thin (e.g. of thickness<<one acoustic wavelength within the part).

Fluid

Generally, tensile forces may not be transferred via the fluid, for example a liquid and/or a gas. In contrast, as will be understood by the person skilled in the art, a least a part of compressive forces may generally be transferred via the fluid. A fluid reservoir may be provided wherein the cavity is in fluid communication with the fluid reservoir. In this way, fluidic coupling between the active element and the acoustic coupling layer may be reduced. For example, if in use the fluid is unable to flow, for example easily, between the active element and the acoustic coupling layer, then effectively these two parts would be strongly coupled, which in turn may mean that a mass of the acoustic coupling layer would couple to that of the active element, affecting its mechanical Q adversely. Additionally and/or alternatively, if in use the fluid, for example a liquid, is unable to flow, for example easily, between the active element and the acoustic coupling layer, at high acoustic powers and high operational frequencies, there is a risk of cavitation, in which liquid vapour bubbles are created. Cavitation may be highly undesirable because such bubbles may be acoustically highly reflective). In this way, a volume of the fluid in the cavity may vary, for example due a change in size of the cavity such as due to relative movement of the active element and the acoustic coupling layer. Additionally/and or alternatively, a mass of the fluid in the cavity may vary, for example due to change in temperature and/or pressure of the fluid. In one example, the transducer comprises a fluid reservoir in fluid communication with the cavity. In one example, the cavity is in fluid communication with the transmission medium, such that the transmission medium provides a fluid reservoir, in use.

Generally, the fluid may be a gas or a liquid. In one example, the fluid is a liquid. The fluid may be provided in the cavity or the cavity may be subsequently at least partly filled with the fluid. In one example, the cavity comprises a first fluid which is replaced by a second fluid.

The fluid may be a high voltage dielectric fluid for hold off high voltages used to drive the transducer at maximum acoustic power output levels while allowing hydrostatic balancing of the fluid pressures between the transmission medium and the internal structure of the transducer.

It should be understood that the fluid is non-adhesive, so as to reduce mechanical and/or structural coupling between the active element and the acoustic coupling layer. That is, the fluid does not provide an adhesive bonding layer, for example between the active element and the acoustic coupling layer. Hence, gels or adherent greases, for example may be undesirable.

In one example, the fluid comprises a liquid, for example a flowable liquid. In one example, a dynamic viscosity of the liquid is from 0.01 to 10,000 centipoise, preferably from 0.1 to 1000 centipoise, more preferably from 0.1 to 100 centipoise. The dynamic viscosity may be measured at 20° C., for example using a Brookfield Dial Reading Viscometer model LV, RV or HA in accordance with the manufacturer's instructions.

In one example, the liquid is selected to provide a desired dynamic viscosity, for example according to the transmission medium.

In one example, the fluid comprises the transmission medium, in use. The transmission medium may be water, for example sea water. For example, the fluid may be initially a gas (i.e. a first fluid), for example air, and subsequently replaced, at least in part or completely, by a liquid (i.e. a second fluid), for example water such as sea water.

Acoustic Meta-Material

In one example, the acoustic coupling layer comprises an acoustic meta-material, for example a binary grating (also known as a 2D grating).

Acoustic impedance matching meta structures (acoustic meta-structures, also known as acoustic meta-materials) may provide improved coupling of sound from the transducer to the transmission medium, for example a fluid transmission medium. Generally, the acoustic meta-structures have anisotropic properties, for example anisotropic acoustic properties. These acoustic meta-structures may provide an anti-reflection effect that reduces the mechanical Q of the transducer, for example a Tonpliz transducer, and thus enhance its fractional bandwidth. Furthermore, these acoustic meta structures may be less susceptible to cavitation-induced delamination of for example adhesive bonds that may be observed in conventional metal-fluid impedance matching structures based on isotropic and/or homogeneous materials, for example polymethyl methactylate (PMMA).

Advantageously, anti-reflection meta-structures (i.e. the acoustic meta-material) for Tonpilz transducers may improve acoustic coupling of acoustic power into the transmission medium, for example seawater, and thus reduce overall mechanical Q. This in turn would improve fractional bandwidths of the Tonpilz transducers. The relatively lower operating frequencies of a Tonpilz transducers (typically less than 80 kHz) may mean that accurate forming of the acoustic meta structure may be less demanding than that required for transducers intended to operate at ultrasonic frequencies, for example 3.3 MHz. Particularly, the acoustic meta-material is in itself advantageous for Tonpilz transducers, even in absence of the cavity. Additionally and/or alternatively, the acoustic anti-reflection properties of the acoustic meta-material may also improve signal reception of a return echo, because less power will be lost through acoustic reflections due to an acoustic impedance mismatch between the transducer and fluid medium.

In one example, the acoustic meta-material comprises acoustic elements having sub-wavelength separations between adjacent acoustic elements to prevent the excitation of $1^{st}$ order diffraction orders in the lowest acoustic velocity medium. Generally the separations should be sub-wavelength since if the meta-material has a periodic structure, acoustic diffraction lobes off the periodic structure will be excited, starting in the material with the lowest acoustic velocity where $1^{st}$ order diffraction off the effective grating will commence at a lower frequency. More specifically, a separation of periodic features should be less than ½ Λ in the lowest velocity medium (generally the transmission medium). If the spacing of the elements is periodic and greater than Λ in an encapsulant arranged to encapsulate the acoustic meta-material and/or the acoustic elements (generally this will be the material with the lowest acoustic velocity, and therefore the smallest wavelength) then 1st order diffraction beams will be generated. The acoustic elements may also be less than one wavelength Λ apart in the transmission medium domain even if encapsulated, otherwise 1st order diffraction beams will be excited in the transmission medium domain.

In one example, an acoustic impedance of the acoustic coupling layer changes in a longitudinal direction away from the cavity. In this way, acoustic coupling of the electroacoustic transducer and the transmission medium is improved.

In other words, the acoustic impedance of the acoustic coupling layer may change in a longitudinal direction away from the active element.

In one example, an acoustic impedance of the acoustic coupling layer changes in a transverse direction.

In this way, acoustic lensing and/or beam steering may be provided. For example, by providing the acoustic coupling layer as two prismatic structures, such as Risley prisms, that hence change the acoustic impedance of the acoustic coupling layer in the transverse direction independent rotation thereof may provide beam steering.

In one example, a thickness of the acoustic coupling layer corresponds to $(2n+1)\Lambda/4$ where $\Lambda$ is the acoustic wavelength within the acoustic coupling layer, and n is either 0 or a positive integer. In this way, where the acoustic coupling layer comprises and/or is an isotropic and/or homogeneous material, for example having an acoustic impedance at a value intermediate in value between the acoustic impedance of the active element and the acoustic impedance of the transmission medium, more specifically ideally equal to square root of the product of the acoustic impedances of the fluid medium and the active element. The anti-reflection layer needs to be $(2n+1)\Lambda/4$ thick because the reflected acoustic beams of each interface suffer identical phase changes upon reflection.

In one example, a thickness of the acoustic coupling layer corresponds to $(n+1)\Lambda/2$ where $\Lambda$ is the acoustic wavelength within the acoustic coupling layer, and n is either 0 or a positive integer. In this way, where the acoustic coupling layer comprises and/or is anisotropic (and/or inhomogeneous) acoustic coupling layer, for example a binary grating. In the latter case of a 'binary' meta-material, there is a 180 degree relative phase change upon reflection from one of the two nominal reflection planes of the metamaterial structure. Therefore the structure preferably has a thickness of $(n+1)\Lambda/2$, so that reflected acoustic beams off each interface are 180° out of phase.

The inventors have determined that from acoustic reflectivity versus frequency results obtained experimentally with a titanium patterned square pillar structure, as described herein, that a first frequency-dependent effect as frequency is increased is appearance of a partial mirror effect at ~3.5 GHz (3.5 GHz was the original target frequency for which an AR effect was being sought). At higher frequencies, a partial anti-reflection effect begins to appear. This outcome of first a reflection effect followed by an anti-reflection effect at higher frequencies requires a relative 180° phase change at one the two nominal reflection planes of the structure.

In one example, corresponding to the case of tapered structures within the acoustic meta-material matrix, a thickness of the acoustic coupling layer corresponds to mΛ where Λ is the acoustic wavelength within the transmission medium (for example, the fluid) or an encapsulant (for example, butyl rubber) in the acoustic coupling layer, and m is a positive real number greater than 0.9.

In one example, the acoustic coupling layer comprises a porous structure. Examples of porous structures include porous materials and structures having perforations therethrough. Porous structures may be formed from metals and plastics materials by machining, investment casting, 3D printing and other such processes.

In one example, the porous structure comprises open pores, for example wherein at least 90% of a total pore volume is provided by open pores. In one example, 100% of the total pore volume is provided by open pores. The open pores may be interconnected pores, for example, the open pores are in mutual fluid communication. In one example, the porous structure consists of open pores. In one example, the open pores are in fluid communication with the transmission medium, in use. In this way, the transmission medium may fill the open pores, for example, thereby improving acoustic coupling by, at least in part, improving matching of acoustic impedances. In one example, the open pores are in fluid communication with the cavity. In one example, the open pores are in fluid communication with the transmission medium and the cavity, in use. In this way, the transmission medium may fill the open pores, for example, thereby improving acoustic coupling by, at least in part, improving matching of acoustic impedances. In one example, the open pores are in fluid communication with the cavity.

In one example, a porosity, for example a mean porosity, of the porous structure is in a range from about 5% to about 90% by volume across the thickness of the porous structure in the propagation direction of the main acoustic beam. In this way, a mass of the acoustic coupling layer may be reduced.

In one example, the porosity changes in a longitudinal direction. For example, the porosity of the porous structure may increase in a direction extending away from the cavity. In one example, a first region of the porous structure proximal the cavity has a first porosity and a second region of the porous structure distal the cavity has a second porosity, wherein the first porosity is less than the second porosity. In this way, an acoustic impedance of the acoustic coupling layer may change, for example progressively change and/or decrease, in the longitudinal direction.

In one example, a density of the acoustic coupling layer changes in a longitudinal direction. For example, the density of the acoustic coupling layer may decrease in a direction extending away from the cavity. In one example, a first region of the acoustic coupling layer proximal the cavity has a first density and a second region of the acoustic coupling layer distal the cavity has a second density, wherein the first density is greater than the second density. In this way, an acoustic impedance of the acoustic coupling layer may change, for example progressively change and/or decrease, in the longitudinal direction.

In one example, the acoustic coupling layer comprises a plurality of acoustic coupling members. The acoustic coupling members may be mutually spaced apart, for example mutually equispaced apart. The acoustic coupling members may be arranged regularly or irregularly. The acoustic coupling members may be arranged in an array or a grid, for example a periodic array or uniformly spaced array such as a square array, or an aperiodic array or nonuniformly spaced array such as a circular array.

The provision of such acoustic coupling members tends to mitigate reflection loss between media of different acoustic impedances. In turn, the mitigated reflection losses tend to widen the fractional bandwidth.

Consequently, more design flexibility is provided where choosing a material of the acoustic coupling members. Further, more design flexibility is offered in choosing a thickness of acoustic coupling layer. In particular, greater thicknesses of the acoustic coupling layer may be provided without significantly reducing the fractional bandwidth offered by the transducer.

Thus, by providing the acoustic coupling members, the transducer is capable of providing a wideband operation.

In one example, a length of an acoustic coupling member of the plurality of acoustic coupling members corresponds the a thickness of the acoustic coupling layer, as described above. In one example, the plurality of acoustic coupling members have the same length.

The length of the acoustic coupling member may govern a centre frequency that is optimally coupled with the transmission medium, for example from a Tonpliz transducer's vibrating head mass into water.

In one example, the acoustic coupling members comprise elongate acoustic coupling members, having aspect ratios of at least one, preferably at least 3, more preferably at least 10. The aspect ratio may be a ratio of a length of an acoustic coupling member to a width, for example a width of a base, of the coupling member.

In one example, the plurality of acoustic coupling members are arranged in a longitudinal direction.

For example, the acoustic coupling members may comprise binary protrusions, each acoustic coupling member extending generally transversely and/or perpendicularly from the cavity and having a generally constant and/or constantly-shaped cross section.

For example, the acoustic coupling members may have the form of rods or pillars having constantly-shaped cross sections i.e. constant cross-sectional areas along the entire length of the acoustic coupling member. These acoustic coupling members may provide a binary grating. A cross sectional shape may be polygonal, for example having three or more sides, or oval, for example circular. Other shapes may be provided. Such acoustic coupling members may reduce transmission losses.

The applicant has determined that such acoustic coupling members may improve, for example optimise, a reduction of transmission loss.

In one example, the acoustic coupling members taper in the longitudinal direction. In this way, an acoustic impedance of the acoustic coupling layer may change, for example progressively change and/or decrease, in the longitudinal direction. In one example, the acoustic coupling members taper linearly, for example a rate of taper is constant, thereby providing a non-linear change in acoustic impedance as a function of distance in the longitudinal direction. For example, the acoustic coupling members may have straight sides, such as pyramidal or conical or frustoconical acoustic coupling members, in which a width or diameter of the acoustic coupling members varies linearly in the longitudinal direction. In one example, the acoustic coupling members taper non-linearly, for example a rate of taper may increase or decrease in the longitudinal direction. For example, the acoustic coupling members may have curved sides. In one example, the acoustic coupling members taper continuously, for example smoothly. In one example, the acoustic coupling members taper discontinuously, for example the acoustic coupling members may comprise one or more steps. The tapered change in cross-section of the protrusion, and thus acoustic impedance, can suppress the periodic variation in acoustic reflections. Such suppression may not be offered by the protrusions having constant cross-sectional area.

In one example, the acoustic coupling members comprise multi-step protrusions, each multi-step protrusion having a first step extending generally perpendicularly from the cavity, the first step having a first shaped cross section, the first shaped cross section being generally constantly-shaped along the axis of the extension and having a second step extending from the first step, the second step having a second shaped cross section, the second shaped cross section being generally constantly-shaped along the axis of the extension, the second step having a smaller cross sectional area than the first.

In one example, the acoustic coupling members comprise tapered acoustic coupling members, each tapered acoustic coupling member extending from the cavity and having a base with a first cross section shape, and extending along the axis of the extension from the base to a second cross-section shape, and continuously tapering between the base and the second section shape.

Depending on the manufacturing process employed to form the acoustic coupling members, it may be more convenient to form tapered acoustic coupling members rather than stepped acoustic coupling members (and vice versa).

The tapered change in cross-section of the acoustic coupling members, and thus acoustic impedance, may suppress the periodic variation in acoustic reflections. Such suppression may not be provided by the acoustic coupling members having constant cross-sectional area. Provided the acoustic coupling members are sub-wavelength in separation, in the acoustic far field the corrugations effect will not be apparent.

In one example, the acoustic coupling members are substantially mutually adjacent. In one example, the acoustic coupling members are arranged to tessellate. A perforation and/or a plurality of perforations, for example small open access holes, may be provided through a base of the tessellated acoustic coupling members to facilitate encapsulation (also known as potting) of the acoustic coupling members with, for example, an elastomeric material such as butyl rubber, by providing an exit route for otherwise trapped air during manufacture.

In one example, an acoustic coupling member of the plurality of acoustic coupling members tapers to a point. In one example, each of the plurality of acoustic members tapers to a point.

The applicant has determined that such protrusions may reduce transmission loss, particularly where bases of the acoustic coupling members are either square or equilateral triangles and arranged to tessellate.

Encapsulant

In one example, the transducer comprises an encapsulant, arranged to encapsulate the acoustic meta-material. For examples, pores and/or voids and/or spacings in the acoustic meta-material may be at least partly filled, preferably completely filled, with the encapsulant. For example, where the acoustic meta-material comprises a porous material, open pores in the porous material may be completely filled with the encapsulant. For example, where the acoustic meta-material comprises a plurality of acoustic coupling members such as rods, spacings between the acoustic coupling members may be completely filled with the encapsulant. In one example, the encapsulant comprises a material selected to have a comparable acoustic impedance to the transmission medium and hence typically a low acoustic impedance, for example an elastomeric material such as butyl rubber. In this way, acoustic coupling between acoustic meta-material and the transmission medium may be maintained, while the acoustic meta-material structure's resistance to corrosion and/or resistance to mechanical impact or shock loading, in use may be improved.

Housing

In one example, the transducer comprises a housing, for example a shroud, having a wall arranged to surround, at least in part, the acoustic coupling layer. In one example, the wall is arranged to surround transverse sides of the acoustic coupling layer. In one example, the housing has an open end, for example distal the cavity. In one example, the housing has two opposed open ends.

In this way, the housing may, at least in part, channel sound emission through the acoustic coupling layer, for example, through the acoustic meta-material.

In one example, the housing is arranged to support, for example mechanically and/or structurally support, the acoustic coupling layer. A frame may be provided, for example, to support the acoustic coupling layer. In this way, shock loadings during for example the system deployment phase may be withstood. In one example, the housing is arranged to support the acoustic coupling layer spaced apart from the active element, thereby providing the required fluid filled cavity. For example, the housing may be arranged to support the acoustic coupling layer spaced apart from the active element by an acoustically (<<wavelength) small distance from the vibrating head mass of a Tonpilz transducer. This prevents direct inertial mass loading of the head mass structure.

In one example, the housing defines a cylindrical housing having a diameter in a range from about 1 to about 2.5 times a diameter of the active element.

In one example, the housing defines a cylindrical housing having a diameter in a range from about 25 mm to about 125 mm, preferably about 40 mm to 60 mm, for example 52 mm. The diameter of the housing may affect a low frequency cut-off of the transducer.

Generally, a head mass of a conventional Tonpilz transducer provides either a round or square front surface. In one example, the wall of the housing is arranged to surround, at least in part, transverse sides of the head mass.

The head mass diameter for a circular piston shape, or the aperture dimensions for a rectangular piston shape for a conventional Tonpilz transducer head governs an angular diffraction required to provide a required scan angle over which a transducer array will operate. This scan angle should be illuminated by a diffraction central lobe of each individual transducer since otherwise, little or no power may be directed in the direction of interest. This diffraction effect may govern a minimum diameter required for the head mass and/or the housing and should be calculated for the highest frequency of interest.

In one example, a wall thickness of the wall is in a range from about 1 mm to about 10 mm, preferably from about 4 mm to about 10 mm. The wall thickness may affect resonant frequency of the housing. Alternatively the wall could be formed by apertures in a metal front plate of thickness 5 to 20 mm within which the front face sound emitting surface of the transducer is recessed.

In one example, a fill ratio, for example a mean fill ratio, of the housing by the acoustic coupling layer is in a range of from about 5% to about 90% by volume, for example internal volume, of the housing. Where the acoustic coupling layer comprises a porous structure wherein the porosity changes in a longitudinal direction or tapering acoustic coupling members, for example, the fill ratio may change in a longitudinal direction.

The fill ratio may determine an effective average acoustic impedance of the acoustic meta-material.

In one example, a fill ratio of the housing changes in a longitudinal direction. For example, the fill ratio of the housing may decrease in a direction extending away from the cavity. In one example, a first region of the housing proximal the cavity has a first fill ratio and a second region of the housing distal the cavity has a second fill ratio, wherein the first fill ratio is greater than the second density. For example, the first fill ratio may be in a range of from 80% to 100% and the second fill ratio may be in a range of from 0% to 20%. In this way, an acoustic impedance of the acoustic coupling layer may change, for example progressively change and/or decrease, in the direction extending away from the cavity. Generally for transmitting sound in to a transmission medium such as water, for example, it is preferable that the acoustic impedance decreases progressively in the direction extending away from the cavity, that is in the direction towards the fluid media into which sound is being launched.

In one example, a shape of the housing is arranged to support longitudinal vibration Eigen-frequency modes. In this way, the transducer may provide a plurality of closely spaced natural resonant modes to support wide bandwidth performance. For example, a shallow s-shape may support longitudinal vibration Eigen-frequency modes of the housing. Alternatively, a kinematic hinge structure around a circumference of the housing may be provided for the same Eigen-frequency vibration mode role.

Tonpilz Transducers

In one example, the transducer is a Tonpilz transducer.

Generally, Tonpilz transducers are highly resonant mechanical structures intended to generate the high acoustic powers required for power projection by an active sonar system.

Tonpilz transducers (also known as acoustic mushrooms) generally refer to certain types of underwater electroacoustic transducers. By sandwiching active materials (for example, piezoelectric and/or magnetostrictive materials and/or other materials as described herein) between a light, stiff radiating head mass and a heavy tail mass, a Tonpilz transducer may operate as either a projector (underwater acoustic source) or a hydrophone (underwater acoustic receiver). The transducers size, odd shape, and acoustic projection capabilities have earned it the moniker 'tonpilz' from the German words Ton (tone) and Pilz (mushroom) and from the figurative similarity. Typically, tonpilz transducers are used in sonar applications. To maximize efficiency, transducers are often placed in arrays: a grid of sometimes hundreds of transducers. This arrangement also allows beamforming and steering. Transducers of this form also lend themselves to compensation against the hydrostatic pressures encountered in sonar, particularly for submarine applications The Tonpilz transducers are usually designed for power rather than bandwidth. Typically, Tonpilz transducers are intended for operation at centre frequencies in the range of 25 kHz to 35 kHz, and for the 25 kHz designs typically are tuned up to have a mechanical Q of 3 to 5 with at least 6 to 7 kHz bandwidth. Tonpilz transducers operating up to about 80 kHz are possible, but this frequency has been in the past been the top limit on the centre frequency for this type of transducer.

FIG. 2A schematically depicts a conventional Tonpilz transducer 1, comprising a piston head mass 2, a tail mass 3, a piezoelectric stack 4 and a stress rod 5.

The piston head mass 2 (also known as head mass) provides the principal sound emitting surface (also known as the front surface) of the Tonpilz transducer 10, and in general is made as lightweight as possible to reduce its inertia. Aluminium alloys are frequently used for this component. The tail mass 3 is normally made as heavy as possible to maximise its inertia to ensure sound is principally coupled out of the resonating Tonpilz transducer 10 via the sound emitting front surface of the head mass 2. The piezoelectric stack 13 (also known as the stack) provides, at least in part, an active element and hence the mechanically active part of the Tonpilz transducer 10 which is driven into vibration by a high voltage signal applied across the individual transducer discs that collectively make up the stack 13. Generally, the stack 13 comprises of set of annular piezoelectric elements that are stacked to provide a large net mechanical movement of the front surface of the head mass 2. The stress rod 5 is used to apply a compressive stress to the piezoelectric stack 13 to prevent the electrical driving voltage from exciting net tensile stresses in the piezoelectric ceramic or crystal stack 13. The stress rod 5 is generally made of a high tensile steel, but should be made as light as possible as it adds to the vibrating mass of the head mass. From a simplistic perspective, the compressive stress applied by the stress rod 5 should be set to a value that it halfway between the compressive stress failure and tensile stress failure points of the piezoelectric elements of the stack 13, and further offset by the half the compressive load arising from the external hydrostatic load of the maximum water depth at which the Tonpilz transducer 10 is required to operate. Generally the compressive stress failure point of a piezoelectric material is very much larger than its corresponding tensile stress failure point.

A primary vibration mode of the Tonpilz transducer 10 is a longitudinal vibration along its axis of symmetry. This mode of vibration tends to have limited bandwidth. The frequency bandwidth Δf of the Tonpilz transducer 10 is generally inversely proportional to the mechanical quality factor Q of the Tonpilz transducer 10, which for the Tonpilz transducer 10 is given according by:

$$Q_m \sim f_c / \Delta f \sim M_h / R_t \qquad (10)$$

Where $M_h$ is the weight of the head mass 2 of the Tonpilz transducer 10, $R_t$ is the radiation resistance of the of the fluid (i.e. the transmission medium) into which the Tonpilz transducer 10 is emitting sound, Δf is the frequency bandwidth of the Tonpilz transducer 10, and $f_c$ is the centre frequency of the Tonpilz transducer 10. The frequency bandwidth of the Tonpilz transducer 10 may therefore be adjusted by either making the head mass $M_h$ of the Tonpilz transducer 10 as light as possible, or making its radiation resistance $R_t$ as large as possible. The latter may be achieved by making the sound emission area of the Tonpilz transducer 10 on its head mass 2 (i.e. the front surface) as large as possible, and hence the classic 'mushroom' shaped geometry of this transducer type.

A number of techniques have been previously proposed to improve frequency bandwidths of Tonpilz transducers.

FIGS. 2B and 2C schematically depict vibration modes of the Tonpilz transducer of FIG. 2A.

For example, multimode coupling of different vibration modes of the transducer structure may be exploited. In particular, the longitudinal and a first 'flapping mode of the head mass 2 structure may be combined. These two modes of vibration are illustrated in the schematic diagrams of FIGS. 2B and 2C, respectively. If the longitudinal and flapping head mass 2 vibration modes are sufficiently close as to partly overlap in their frequency responses, then the two modes of vibration become strongly coupled and overall bandwidth of the transducer is increased. Using this approach, fractional bandwidths of ~37.8% (Δf~13.3 kHz) of the centre frequency of ~35.1 kHz may be achieved.

FIGS. 3A and 3B schematically depict known Tonpilz transducers configurations designed to improve the fractional frequency bandwidth of a conventional Tonpilz transducer as illustrated in FIG. 2.

For example, multi-resonant structures, for example triple resonant structures, may be exploited for Tonpilz transducers. FIG. 3A shows a triple resonant structure 30A including a tail mass m1, a piezoelectric stack c1 followed by a pair of central masses m2, m3 separated by a compliant spring c2, followed by a further compliant spring c3 and finally a lightweight piston head m4 is used to radiate sound into the surrounding water. FIG. 3B shows another triple resonant structure 30B in including one of the additional central masses m2 and compliant springs c2, and also including a quarter-wave acoustic matching layer of poly methacrylate (PMMA) mass m4 and compliance c3 on the fluid side of the head mass m3. These triple resonant structures provide a wide bandwidth that spans ~13 kHz to 35 kHz by virtue of providing a sequence of well-spaced local longitudinal mode resonant frequencies. However the power generation flatness is relatively poor with pronounced peak responses centred on the individual resonance frequencies of the transducers, particular so for the structures without a ¼ wave matching layer. The predicted results exhibit sharper variations in the bandshape performance than the measured results, probably due to losses within the transducer structure, and such additional losses would naturally broaden the Q of the resonances.

For example, an overall density of the head mass may be reduced by using a hollow head, thereby reducing a mass of the head mass compared with a solid head mass.

In contrast to these previously-proposed techniques, the acoustically thin (<<Λ) fluid filled cavity of the present invention separates the head mass and the acoustic coupling layer, which for example could be either a conventional material such as PMMA or an acoustic meta-material as described herein. This fluid filled cavity addresses several potential issues that may affect the performance of a Tonpilz transducer Firstly, mechanically and/or structurally coupling the acoustic coupling layer to the head mass may adversely affect the mechanical Q of the vibrating structure (Equation 10).

Hence, an increase in the effective head-mass, for example by the acoustic coupling layer, will increase the mechanical Q of the Tonpilz transducer and so in itself will reduce the bandwidth Δf of the Tonpilz transducer's natural resonance.

Secondly, mechanically and/or structurally coupling the acoustic coupling layer to the head mass by bonding, for example using an adhesive layer, may result in adhesive delamination of the bond in use, when subject to the extremely high power outputs of an active sonar Tonpilz transducer.

Centre Frequency

In one example, a centre frequency f of the transducer is in a range from about 1 kHz to about 80 kHz, preferably 10 to 60 kHz, more preferably 20 to 50 kHz, for example 25, 30, 35 or 40 kHz.

Table 1 shows acoustic attenuation versus frequency in water. Due to the significant acoustic attenuation above 80 kHz, active long range sonar systems in seawater these higher frequencies may be inefficient. However, high frequency operation, such as above 80 kHz, might be beneficial for short range communications applications, for example for private and/or covert transmissions.

TABLE 1

Acoustic attenuation dB/km versus frequency in water at a temperature of 8° C., a salinity of 35 ppt, an operating depth of 50 meters, and an acidity of pH 8. Table data source: NPL website, using the algorithm of Ainslie and McColm (1998).

| Acoustic Frequency | Absorption Coefficient |
|---|---|
| 1 kHz | 0.06 dB/km |
| 10 kHz | 1.04 dB/km |
| 20 kHz | 3.6 dB/km |
| 25 kHz | 5.23 dB/km |
| 30 kHz | 7.27 dB/km |
| 35 kHz | 9.33 dB/km |
| 40 kHz | 11.4 dB/km |
| 50 kHz | 15.7 dB/km |
| 80 kHz | 26.5 dB/km |
| 100 kHz | 32.1 dB/km |

It is generally beneficial to reduce a centre frequency of the transducer while maintaining or increasing the frequency bandwidth, for example subject to noise considerations. This will improve an operational range of an active sonar transducer, for example. Although low frequency noise due to ambient sea state noise will increase as the frequency is reduced, the reduced acoustic attenuation over transmit and receive paths to/from the target will for long range targets will fall at an even faster rate.

Al—Be Alloy

In one example, the Tonpilz transducer comprises a head mass comprising an Al—Be alloy. Reducing the mass $M_h$ of the sound emitting head mass has been shown to be highly beneficial for a given sound emitting surface area (which determines $R_r$). This is because it reduces the mechancial Q of the transducer as given by equation 10.

The head mass of the Tonpilz transducer can be further reduced using a lighter weight alloy, namely AlBeMet 162, which is alloy of beryllium and aluminium. This material has a combination of low density, high electric modulus, and high heat capacity. Its key properties are summarised in Table 2 below.

Other advantages of AlBeMet 162 is that its coefficient of thermal expansion is substantially lower than aluminium, and would therefore be a better thermal expansion match to the Piezo-electric material to which it would be customarily bonded. Its heat conductivity is also higher than that of a conventional aluminium alloy, such as 6082-T6. However, corrosion resistance properties may be inferior to conventional aluminium alloys used for this application, and so better corrosion protection would be required.

TABLE 2

Comparison of Material Properties of AlBeMet 162 and Aluminium Alloy 6082-T6

|  | AlBeMet 162 | Aluminium Alloy 6082-T6 |
|---|---|---|
| Density | 2.10 g/cc | 2.7 g/cc |
| Youngs Modulus | 193 GPa | 69 GPa |
| Longitudinal Acoustic Velocity | ~11,669 m/s | ~6,125 m/s |
| Acoustic Impedance (MRays) | 24.50 MRayls | 16.54 MRayls |
| Poissons Ratio | 0.33 | 0.33 |
| CTE @25° c. | 13.9 ppm/° C. | 23.1 ppm/° C. |
| Yield Stength | 276 MPa | 310 MPa |
| Thermal Conductivity | 210 W/m °K | 172 W/m °K |

The longitudinal acoustic velocity values (and thus the acoustic impedance values) in Table 2 were calculated using the well-known formula for the speed of a longitudinal wave:

$$C_L = \sqrt{\frac{E(1-\sigma)}{\rho(1-2\sigma)(1+\sigma)}} \quad (11)$$

where E is the Youngs Modulus, σ is Poisson's Ratio and ρ is density.

The extra-ordinary high velocity of AlBeMet 162 means that the acoustic thickness of the head is nearly half that of an aluminium head of the same geometric size. This in part compensates for AlBeMet 162's higher acoustic impedance which in itself would yield a higher acoustic reflectivity at the sea water—Tonpilz head interface.

Single Crystal Piezoelectric Material

In one example, the active element comprises a single crystal piezoelectric material.

The single crystal piezoelectric material may be provided by Solid State Single Crystal Growth (SSCG). This growth technique offers a route to more economic manufacture of single crystal piezo-electric substrates for sonar applications.

SSCG is a refinement of a method called Oswald ripening where heat is applied to facilitate the growth within the initial micro-crystalline structure of a conventional ceramic crystal of ever larger crystal grains. SSCG employs a single crystal slice as a seed facilitating this process. As such the microcrystals of the polycrystalline material progressively 'dissolve' and then re-crystallise on a single crystal growth front with the same orientation as the seed crystal. It is possible to use a seed crystal of a different crystal composition altogether to seed this growth process. A thin slice of BaTiO3 single crystal may be used as a seed to initiate the growth of a PMN-PT single crystal from a precursor block of PMN-PT polycrystalline ceramic.

The technique can also be used to convert a sintered ceramic annular ring of the type used in a Tonpilz transducer, from the polycrystalline precursor into a single crystal annular block.

According to the second aspect, there is provided a Tonpilz transducer comprising:
- an active element; and
- an acoustic coupling layer arranged to acoustically couple, in use, the active element to a transmission medium;
- wherein the acoustic coupling layer comprises an acoustic meta-material.

The acoustic meta-material may be as described with respect to the first aspect. Particularly, as described above, by providing the acoustic meta-material as described above for a Tonpilz transducer, acoustic coupling may be improved even in absence of the cavity, for the reasons as described above. The acoustic meta-material may be coupled to or integrated with a head of the Tonpilz transducer. The Tonpilz transducer according to the second aspect may include any of the features as described for the transducer according to the first aspect.

According to the third aspect, there is provided an array comprising a plurality of transducers according to the first aspect and/or the second aspect.

BRIEF DESCRIPTION OF THE DRAWINGS

For a better understanding of the invention, and to show how exemplary embodiments of the same may be brought into effect, reference will be made, by way of example only, to the accompanying diagrammatic Figures, in which:

FIG. 1 depicts a graph of predicted ambient noise spectrum level with sea state and thermal noise versus frequency;

FIG. 7 schematically depicts a transducer according to an exemplary embodiment;

DETAILED DESCRIPTION OF THE DRAWINGS

Figure 2A:
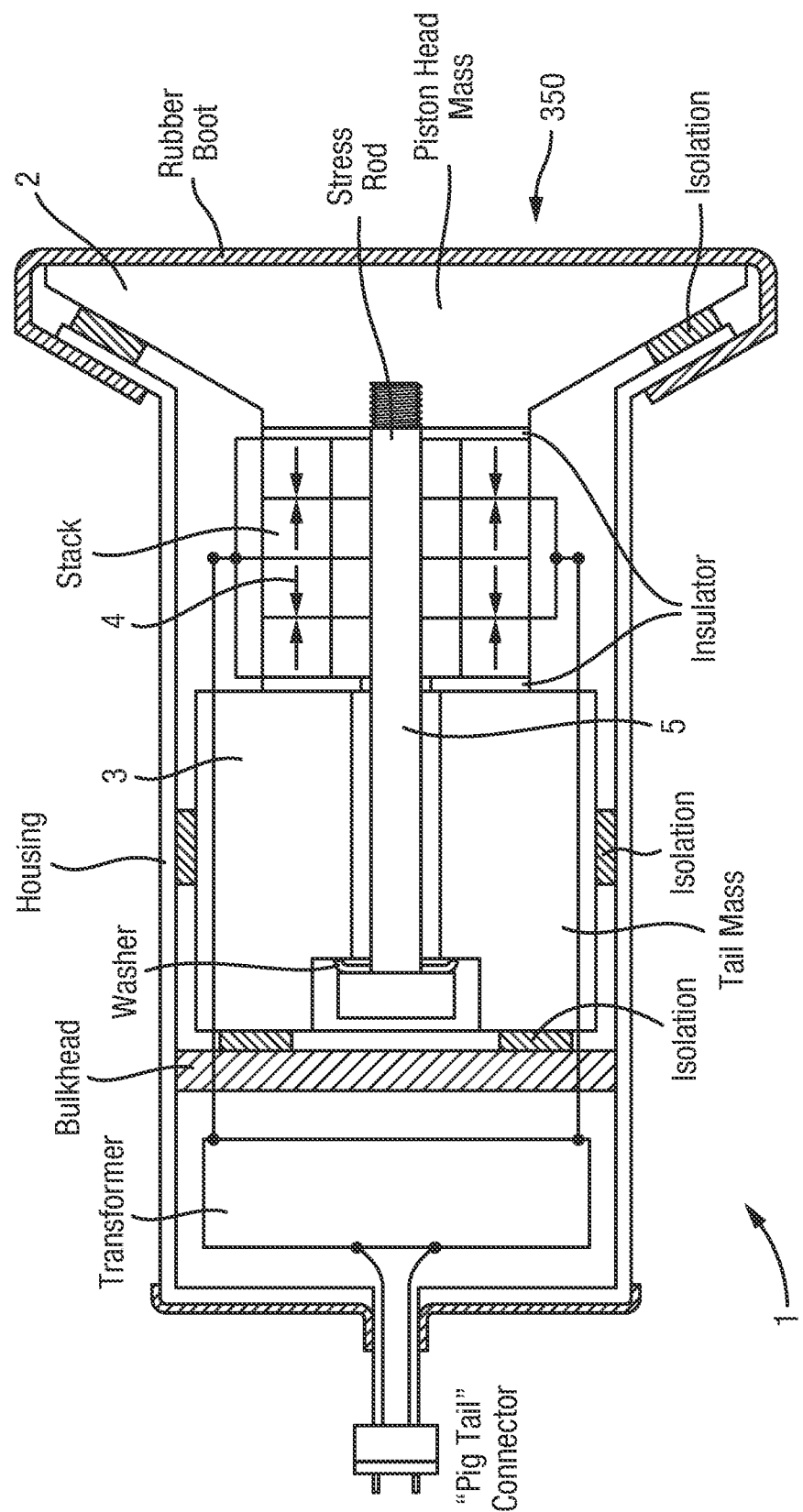
FIG. 2A schematically depicts a conventional Tonpilz transducer.
Figure 2B:
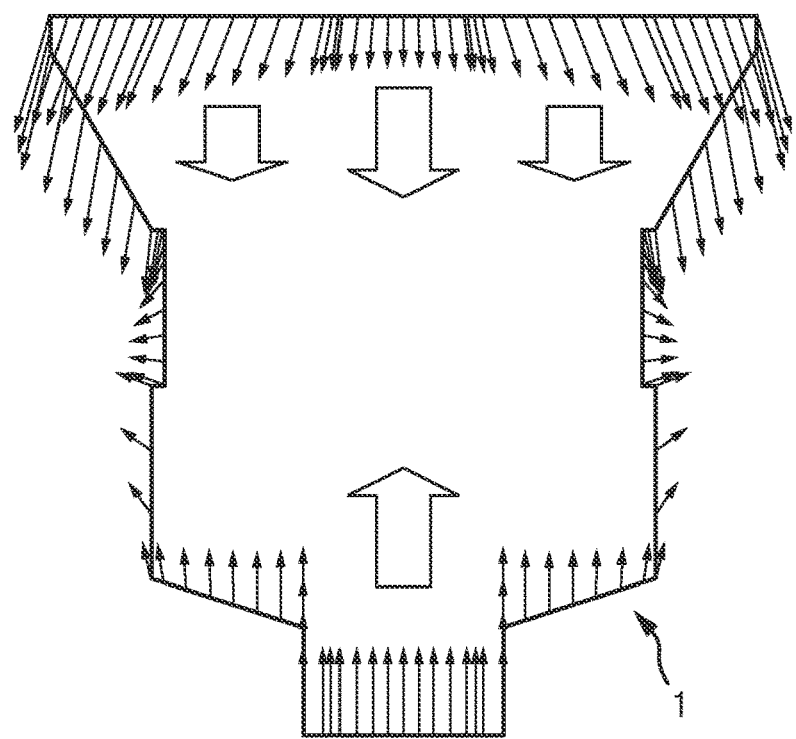
FIGS. 2B and 2C schematically depict characteristic vibration modes of the Tonpilz transducer of FIG. 2A consisting of a longitudinal mode (2B) and a flapping mode (2C)
Figure 2C:
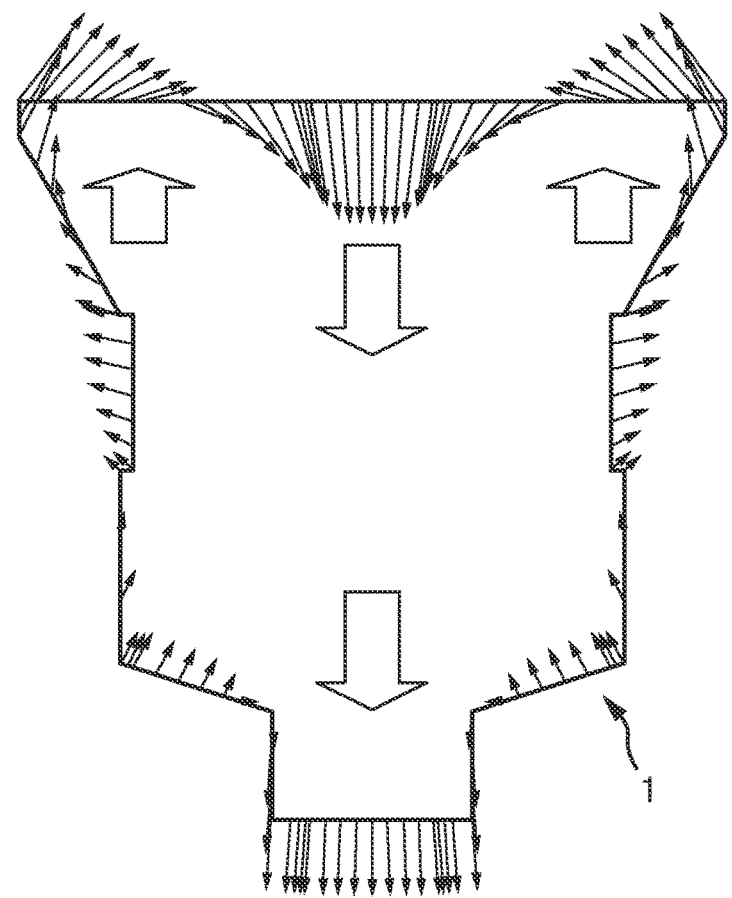
Figure 3A:
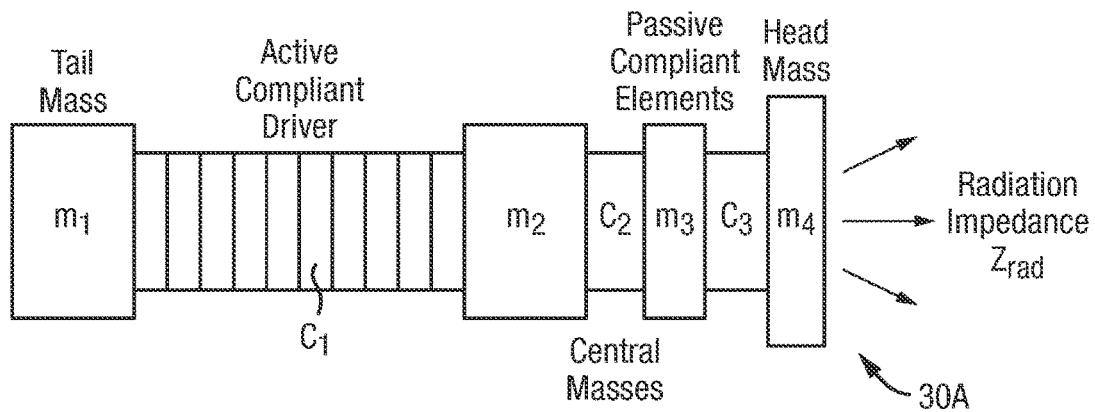
FIGS. 3A and 3B schematically depict a published triple resonant structure Tonpilz transducers as a configuration to provide a route to wider frequency bandwidths.
Figure 3B:
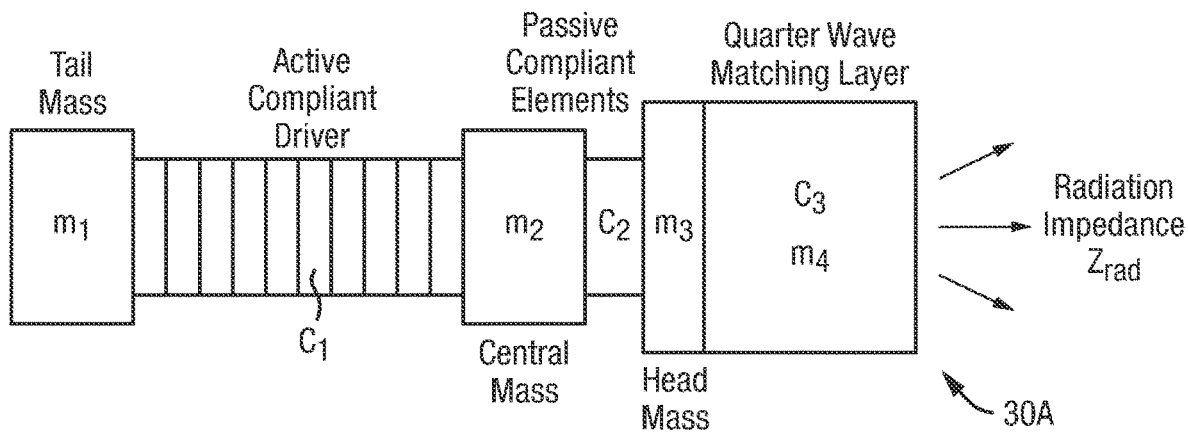
Figure 4:
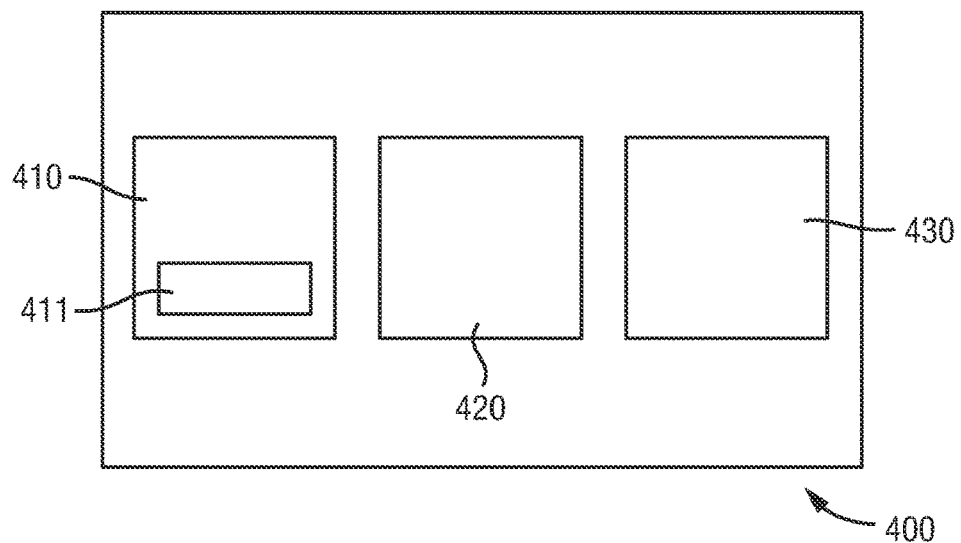
FIG. 4 schematically depicts a transducer according to an exemplary embodiment.

FIG. 4 schematically depicts a transducer 400 according to an exemplary embodiment.

In detail, the electroacoustic transducer 400 comprises an active element 410. The electroacoustic transducer 400 comprises an acoustic coupling layer 430 arranged to acoustically couple, in use, the active element to a transmission medium. The electroacoustic transducer 400 further comprises a cavity 420 arranged between the active element 410 and the acoustic coupling layer 430 to receive a fluid. In this way, acoustic coupling of the electroacoustic transducer and the transmission medium is improved, as described above.

In this example, the active element 410 comprises a piezoelectric material 411. The active element may comprise additionally and/or alternatively other materials as described previously.

Figure 5A:
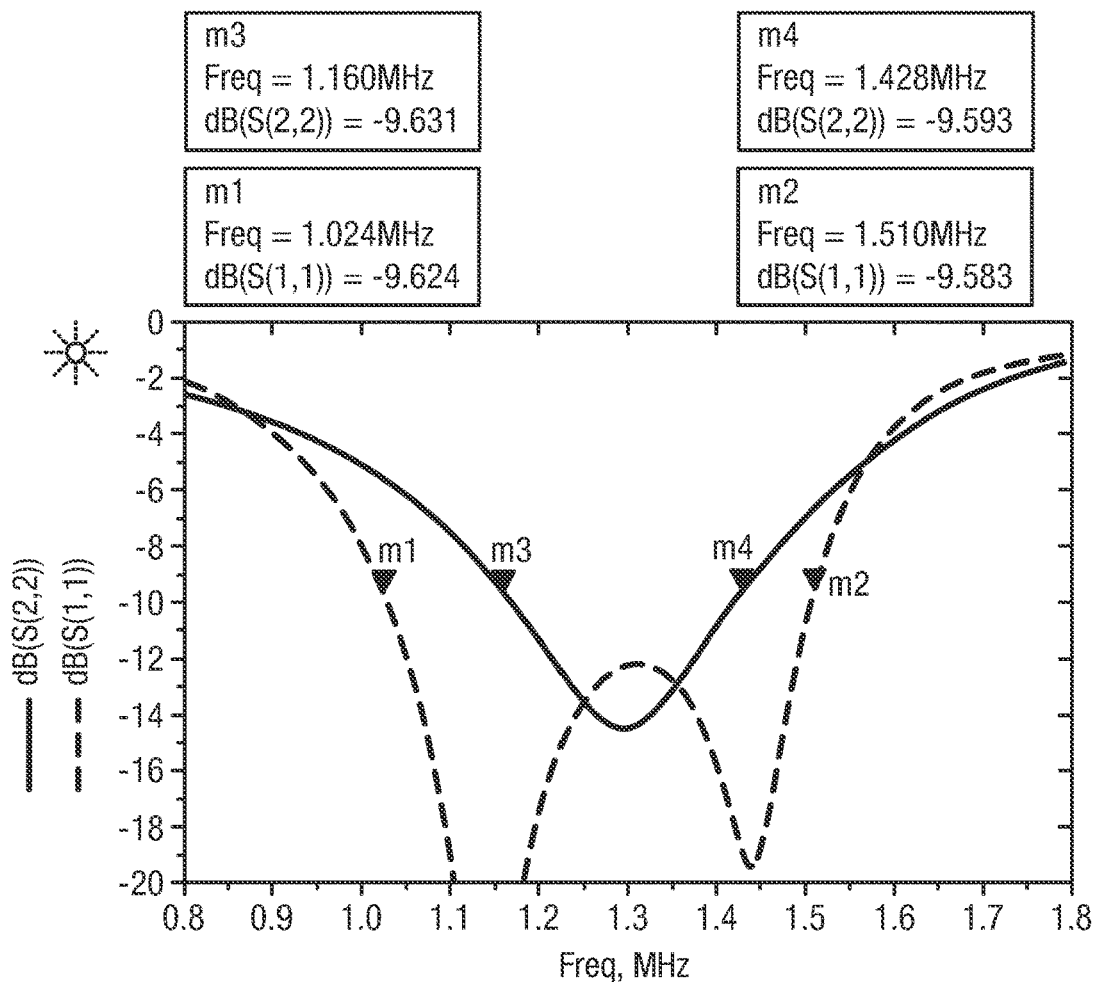
FIGS. 5A and 5B depict calculated electrical insertion loss frequency responses for an electrically tuned Pz27 grade PZT transducer with and without a controlled thickness of an acoustically thin and acoustically impedance mismatched layer between the transducer and the substrate into which sound is being broadcast.
Figure 5B:
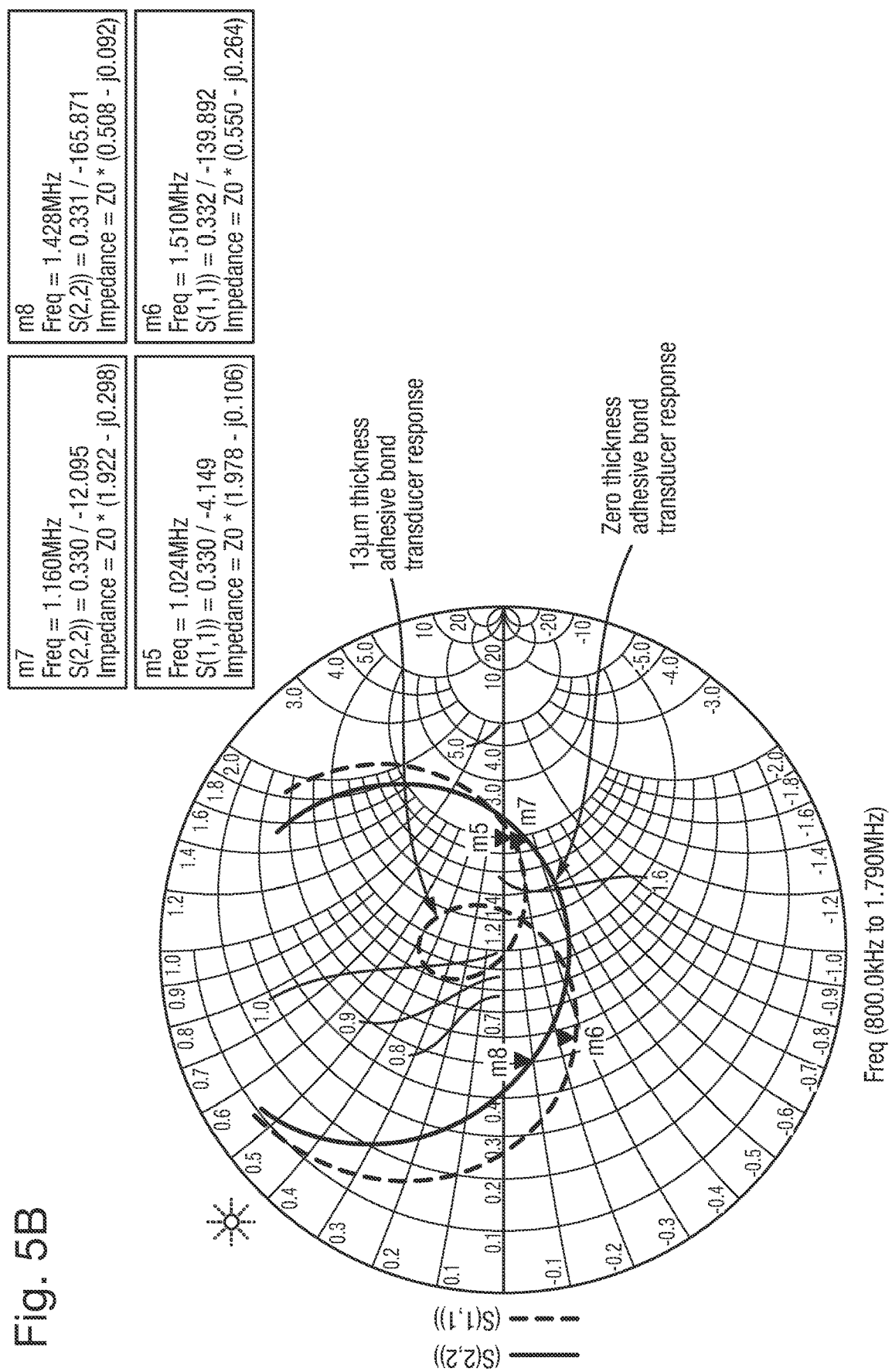

FIGS. 5A and 5B depict calculated frequency responses for an electrically tuned Pz27 grade PZT transducer with and without a low acoustic impedance filled layer of controlled thickness between the piezoelectric platelet and the steel substrate into which sound is being broadcast;

In detail, FIG. 5A shows the electrical Insertion Loss Loss responses of a transducer both with an impedance mismatch layer and without an impedance mismatch layer. FIG. 5B shows the Smith Chart plots, corresponding to the Insertion loss plots of FIG. 5A. In this example, the impedance mismatch is provided by a 13 μm adhesive layer comprising a 2 part epoxy resin adhesive layer (MasterBond EP46HT-2), to demonstrate a principle of the impedance mismatch layer, as provided by the cavity comprising the fluid according to the invention.

Particularly, in this transducer, a platelet of PZT is bonded to a steel barrier with an epoxy resin. The acoustic impedance of the epoxy is far smaller than the acoustic impedances of both the steel barrier and PZT ceramic transducer.

The surprising result with this high frequency transducer design is that although the acoustic impedance of the epoxy bond is completely mismatched from the two substrates that it bonds together, the optimal structural design with the widest fractional bandwidth is not obtained by making the adhesive bond-line as thin as possible; although the bond line needs to be thin, the optimal bond line thickness should generally be non-zero in thickness. Modelling of the transducers electrical response shows that reducing the thickness of the adhesive layer from 13 µm to zero reduced the 2:1 VSWR bandwidth of the transducer by approximately ~50%. The plots show modelled electrical insertion loss responses for the same transducer, using individually optimised electrical matching circuits for each case, with and without a low acoustic impedance adhesive bond layer between the transducer and the steel barrier.

The reflectivity of the epoxy interface between the piezoelectric substrate and the steel substrate to which it is bonded is found to rapidly increase with the bond thickness until subsequent constructive interference effects in the bond layer generate a series of periodic narrow transmission windows with increasing bond thickness. In transducer design the epoxy interface cannot be ignored unless it extremely thin, that is for example between $\ll \lambda/10$ to $<\lambda/100$ at the operational centre frequency. The calculated reflectivity of the 13 µm thick adhesive layer is 30.3%. This is much larger than the reflectivity arising from the acoustic impedance mismatch of the piezoelectric layer and the 17-4 stainless steel substrate of only 2.2%.

The greatest improvement to the fractional bandwidth of the transducer from a controlled thickness bond layer is found to be achieved when the acoustic impedance of piezoelectric layer is smaller than that of the substrate into which the piezoelectric is coupled.

The cavity comprising the fluid according to the invention is expected to behave similarly to the adhesive layer.

Figure 6A:
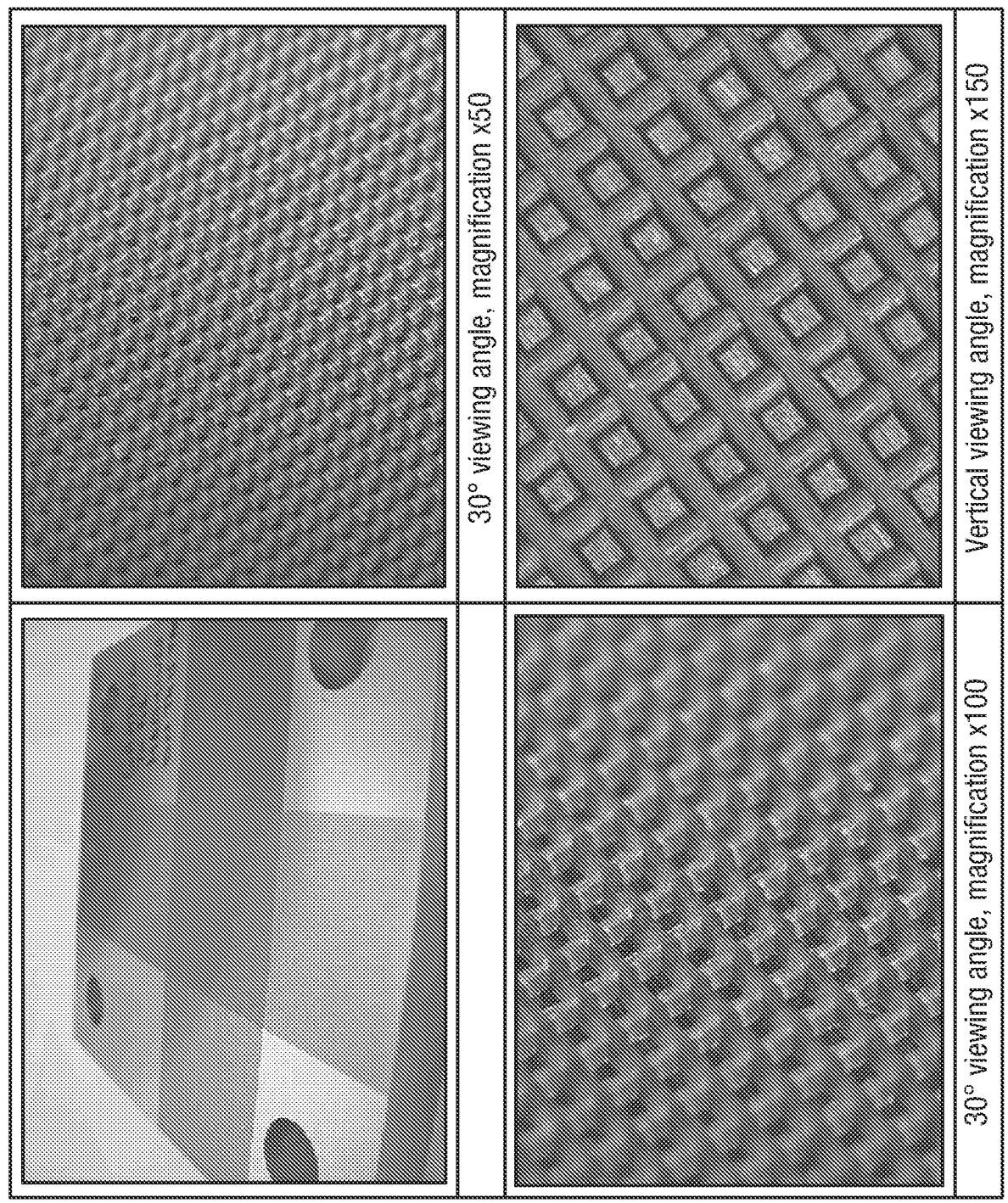
FIGS. 6A and 6B depict photographs of an acoustic meta-material according to an exemplary embodiment and measured reflection coefficients for a transducer comprising the acoustic meta-material, respectively.
Figure 6B:
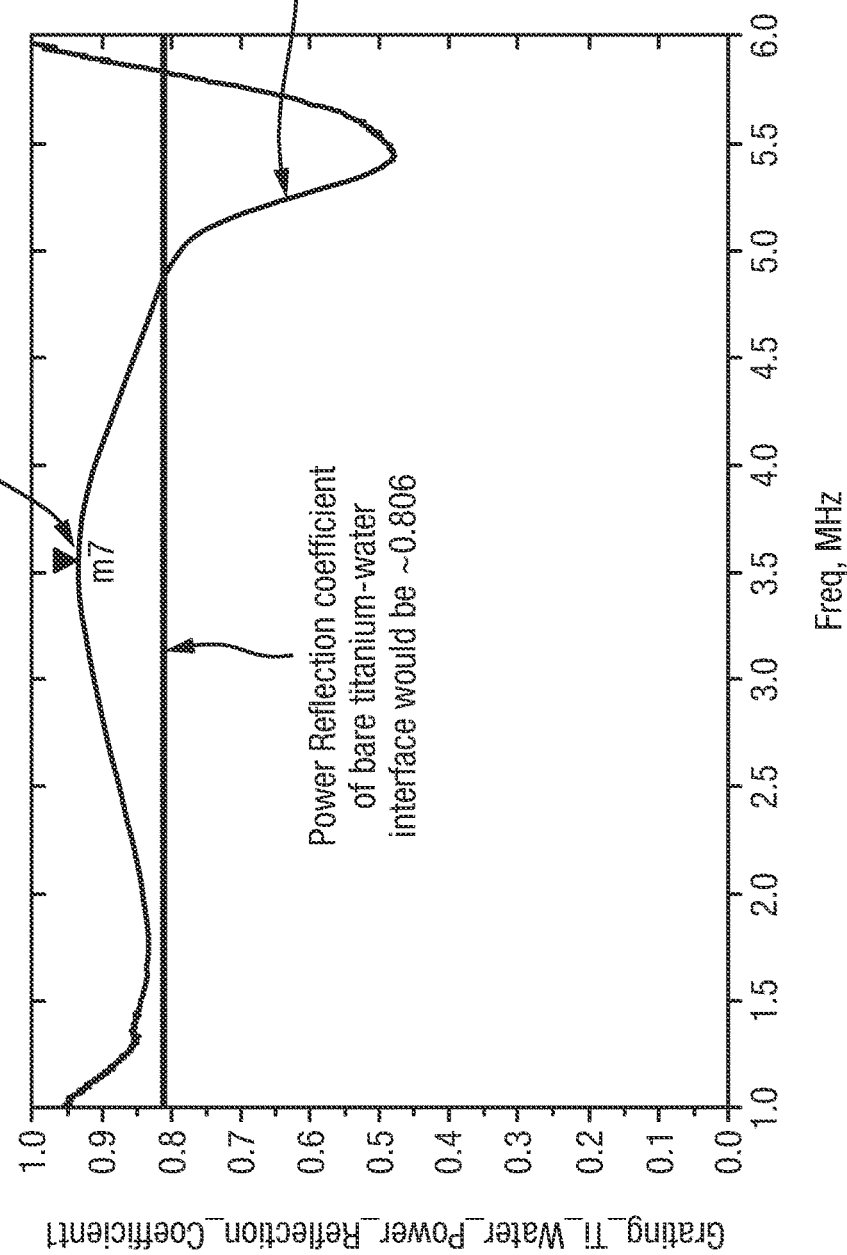

FIGS. 6A and 6B depict photographs of an acoustic meta-material according to an exemplary embodiment and measured reflection coefficients for a transducer comprising the acoustic meta-material, respectively.

In detail, FIG. 6A depicts photographs of a binary grating structure comprising a rectangular array of approximately square pillars that were sawn into the surface of the titanium substrate using a wafer saw. This binary grating was designed for a 36° Y cut lithium niobate transducer with a centre frequency of 3.3 MHz and a 2:1 VSWR frequency bandwidth of 1.51 MHz, a fractional bandwidth $\Delta f/fc$ of 45.5%.

In detail, FIG. 6B depicts results of acoustic reflectivity of a flat interface between titanium and de-ionised water from simple acoustic impedance mismatch theory would be ~80.6%. The results show that the reflectivity of the grating surface over the frequency range ~1 to ~6 MHz varies from a peak reflectivity of 93.4% at 3.557 MHz to less than 50% reflectivity at 5.45 MHz, where the anti-reflection performance of the grating is then compromised by appearance of 1st order diffraction lobes in the water medium from the square pillars of the array whose square pitch was 280 µm.

Hence, for example, relatively simple acoustic meta-structures consisting of a square symmetric array of sub-wavelength (in water) square pillars may markedly change the acoustic reflectivity of a titanium-water interface over a wide frequency band centred on 3.56 MHz.

Hence, for example, relatively complex tapered metal profile acoustic meta-structures that progressively match the impedance of the metal to the fluid may provide further improved performance. These relatively complex acoustic meta-structures will be more practical to fabricate for transducers designed to operate at centre frequencies of 25 kHz to 35 kHz, than at a relatively higher centre frequency of ~3.6 MHz.

FIG. 7 schematically depicts a transducer 700 according to an exemplary embodiment.

In detail, the electroacoustic transducer 700 comprises an active element 710. The electroacoustic transducer 700 comprises an acoustic coupling layer 730 arranged to acoustically couple, in use, the active element to a transmission medium W. The electroacoustic transducer 700 further comprises a cavity 720 arranged between the active element 710 and the acoustic coupling layer 730 to receive a fluid. In this way, acoustic coupling of the electroacoustic transducer and the transmission medium is improved, as described above.

In detail, the electroacoustic transducer 700 is a Tonpilz transducer comprising a piston head mass 702, a tail mass 703, a piezoelectric stack 711 and a stress rod 705. In this example, the active element 710 comprises the piezoelectric stack 711. The piezoelectric material 711 is in the form of a stack of four annular rings that for piezoelectric materials are optimally poled in adjacent rings in opposite directions. In this way, an issue of a ground electrode being directly next to a high voltage live electrode, and separated from one another by only a thin adhesive layer typically, is avoided. The transmission medium W is water.

The cavity 720 has a thickness of 1 mm in this example and is completely filled with the transmission medium W. The cavity 720 is in fluid communication with the transmission medium W, such that the transmission medium provides a fluid reservoir, in use.

The acoustic coupling layer 730 comprises an acoustic meta-material 731 comprising 37 (i.e. a plurality) acoustic coupling members 732. The acoustic coupling members 732 are in the form of rods or pillars having constantly-shaped circular cross sections. The acoustic coupling members comprise elongate acoustic coupling members, having lengths of 50 mm and diameters of 4 mm and hence aspect ratios of 12.5. A length of an acoustic coupling member of the plurality of acoustic coupling members 732 corresponds to $\Lambda/2$ where $\Lambda$ is the acoustic wavelength within the acoustic coupling layer. The plurality of acoustic coupling members 732 have the same length.

The plurality of acoustic coupling members 732 are arranged mutually aligned in a longitudinal direction. The plurality of acoustic coupling members 732 are substantially mutually adjacent, equispaced apart by a distance 7 mm. The plurality of acoustic coupling members 732 are arranged in a regular square array. Regions between the plurality of acoustic coupling members 732 provide open pores. The open pores in this example are in fluid communication with the transmission medium W, in use, but in other examples the pores would be filled with for example butyl rubber to isolate the acoustic coupling members from seawater corrosion. The open pores are also in fluid communication with the cavity 720. Where the acoustic meta-material is potted with a material such as Butyl rubber, a access channel to the cavity 720 would need to be provided to a fluid reservoir or alternatively to the external fluid medium W.

The transducer 700 comprises a housing 750 having a wall 751 arranged to surround the acoustic coupling layer 730. The housing 750 defines a cylindrical housing having an inner diameter of 52 mm. A wall thickness of the wall 751 is 5 mm. A fill ratio of the housing 750 by the acoustic coupling layer 730 is 78.1%.

The housing 750 has an open end 752, in this example distal the cavity 720 and a closed end 753, proximal the cavity 720. The housing 750 is arranged to support, for example mechanically and/or structurally support, the acoustic coupling layer 730, using a frame (not shown). A transverse thickness of the frame is <<Λ. The housing 750 is arranged to support the acoustic coupling layer 730 spaced apart from the active element 710, thereby providing the cavity 720.

The active element comprises a polycrystalline ceramic piezoelectric material. Lead Zirconate Titanate (PZT-4).

Figure 8A:
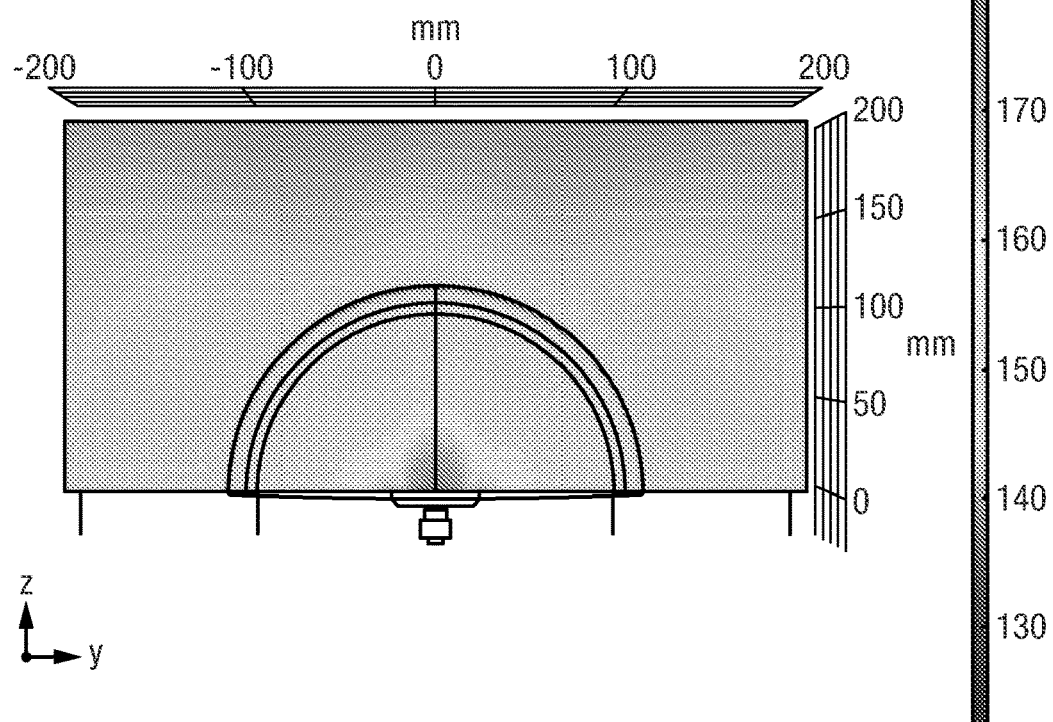
FIGS. 8A to 8C depict calculated sound pressure level plots for a conventional transducer.
Figure 8B:
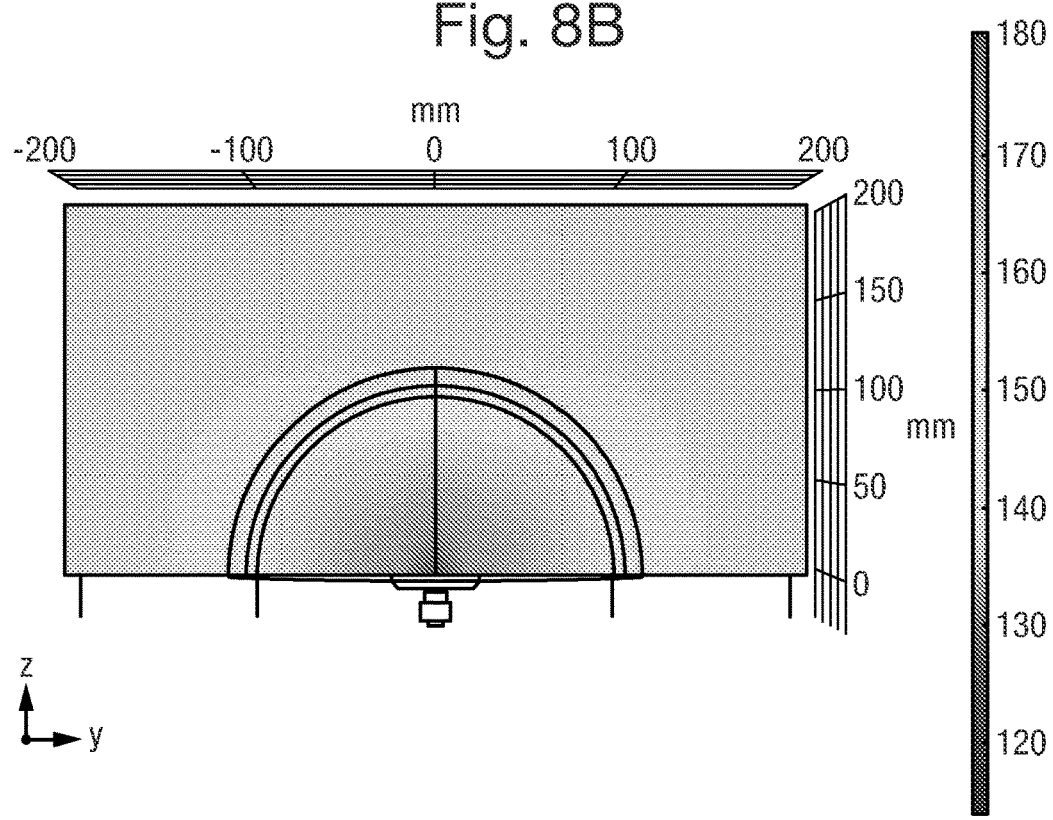
Figure 8C:
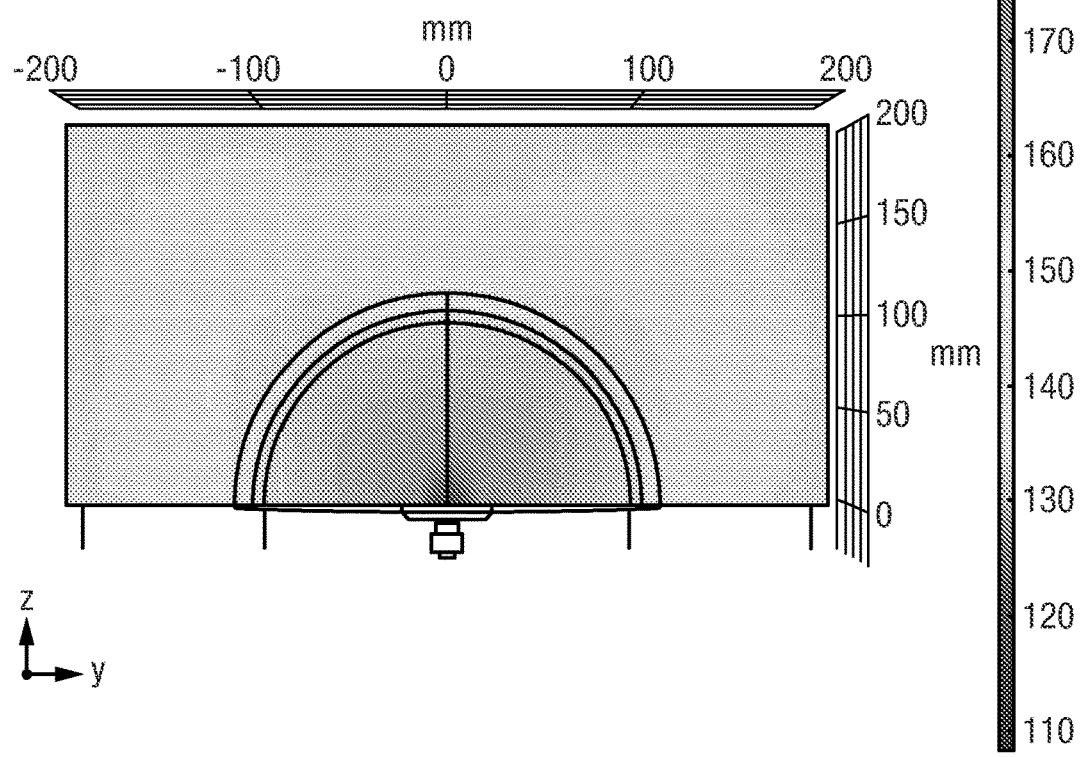

FIGS. 8A to 8C depict calculated sound pressure level plots for a conventional Tonpilz transducer.

Figure 9A:
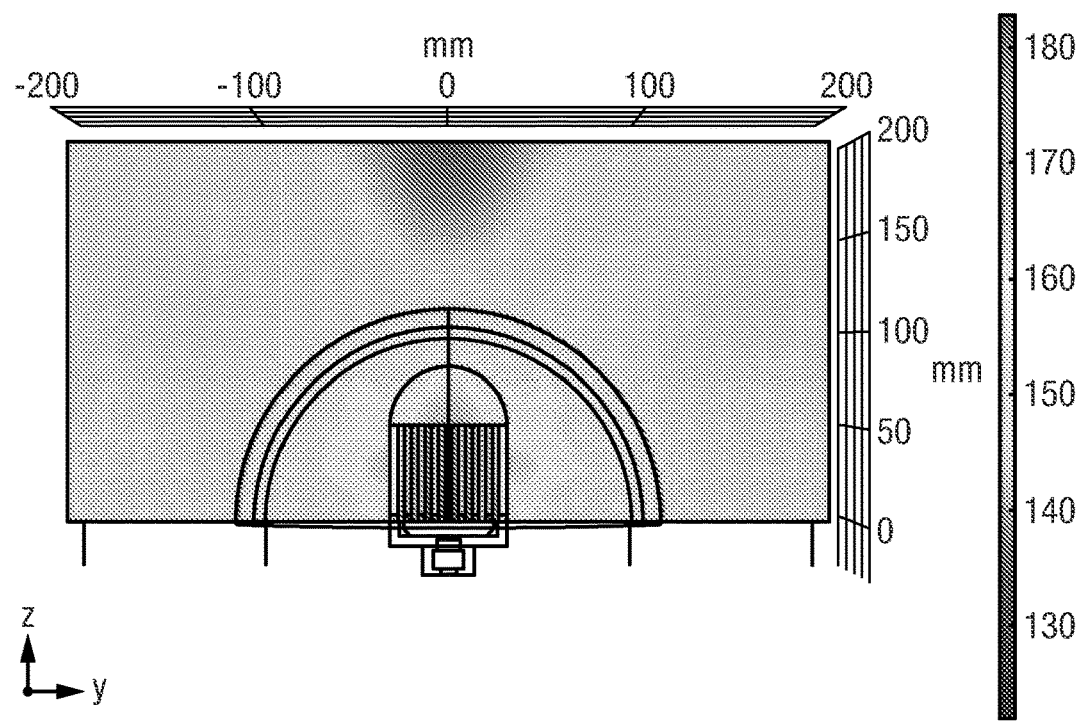
FIGS. 9A to 9C depict calculated total radiated acoustic power plots for the transducer of FIG. 7.
Figure 9B:
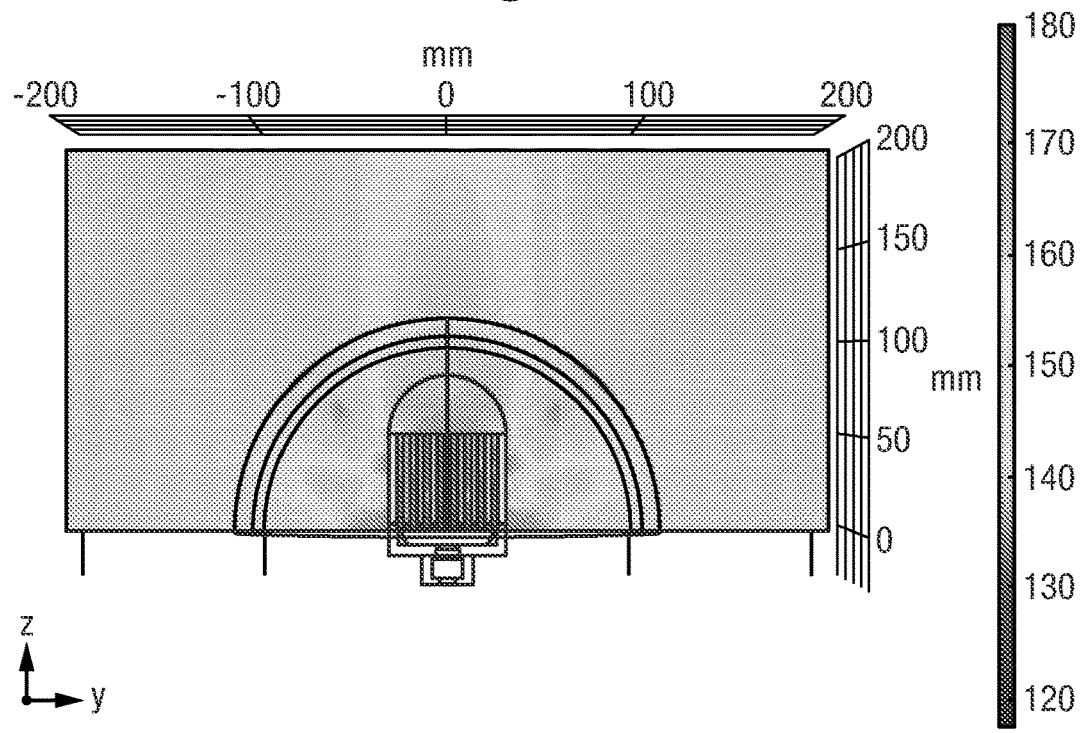
Figure 9C:
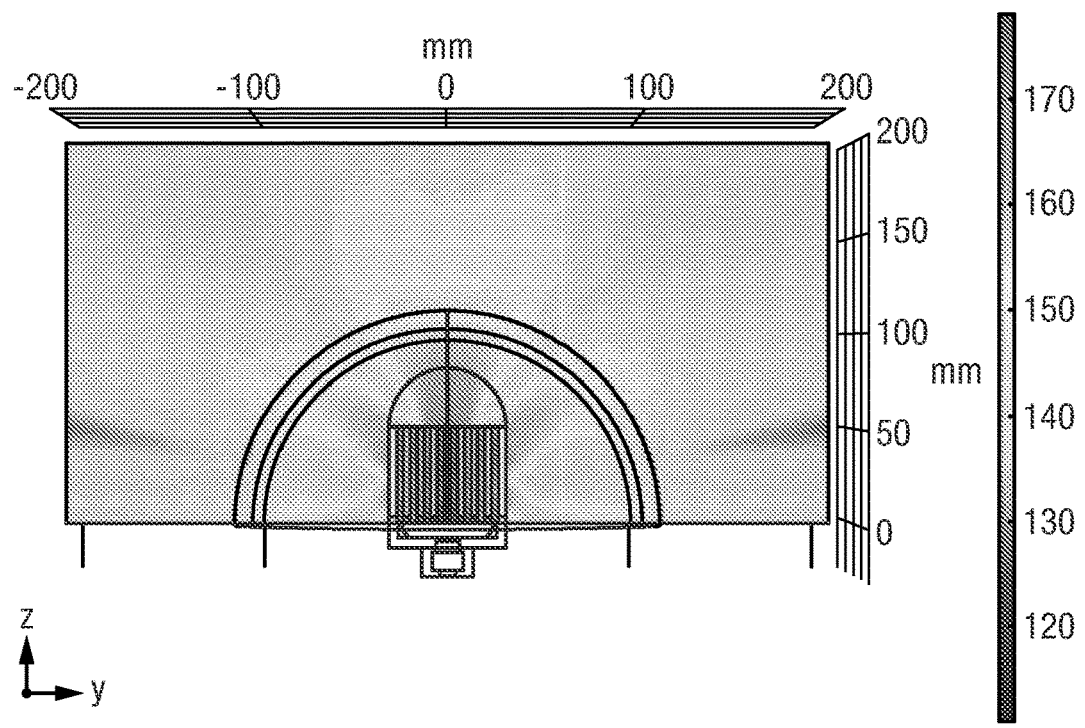

FIGS. 9A to 9C depict calculated total radiated acoustic power plots for the Tonpilz transducer of FIG. 7 as a function of frequency In detail, FIGS. 8A to 8C and FIGS. 9A to 9C depict sound pressure level (dB) plots calculated using COMSOL Multiphysics (RTM) Modeling Software (COMSOL, Inc., USA). FIGS. 8A and 9A are calculated at 30 kHz, FIGS. 8B and 9B are calculated at 35 kHz and FIGS. 8C and 9C are calculated at 40 kHz.

At 35 kHz, the central acoustic beam of the meta-material structure (FIG. 9B) is much more collimated that achieved with a standard Tonpilz transducer.

FIG. 9 shows calculated total transmitted sound power plots for the transducer of FIG. 7 as a function of frequency with and without the acoustic meta-material structure and shroud described above.

Figure 10:
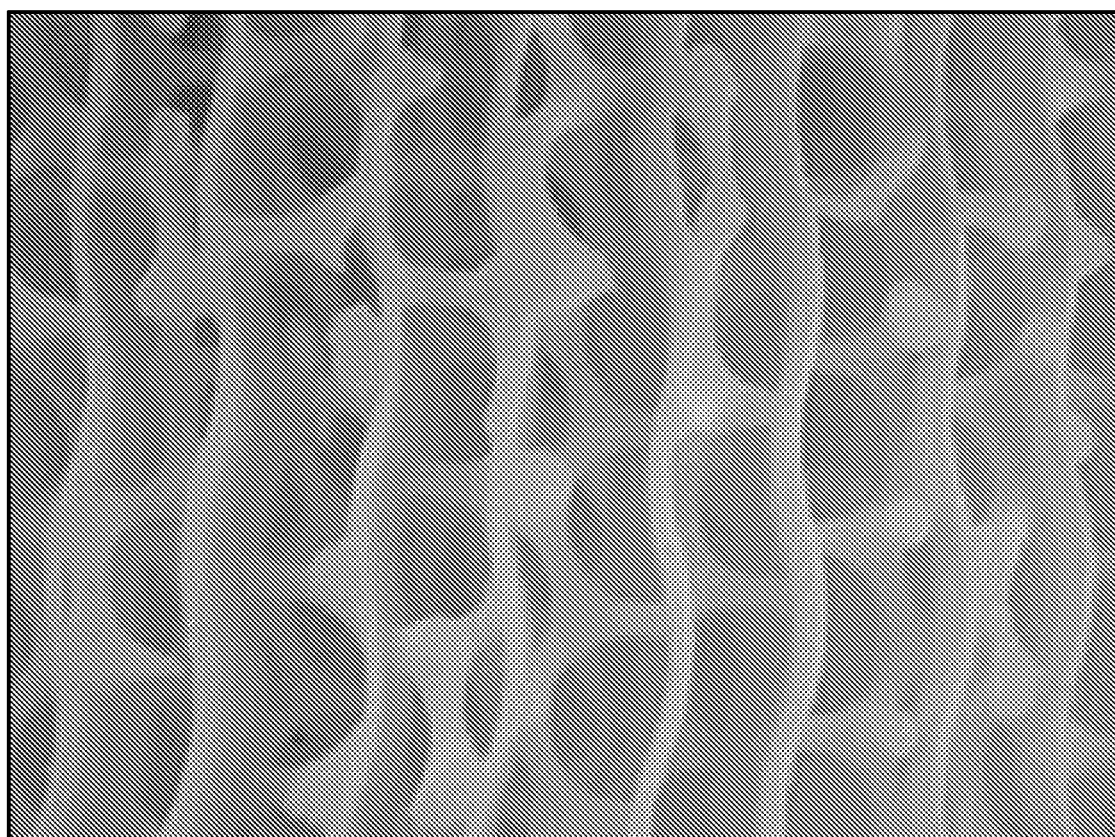
FIG. 10 depicts a photograph of an acoustic meta-material according to an exemplary embodiment.

FIG. 10 depicts a photograph of an acoustic meta-material AMM according to an exemplary embodiment.

In detail, the acoustic meta-material AMM is formed by 3D printing, providing a mechanically stiff acoustic meta-material structure having interconnected open pores, suitable for an acoustic coupling layer according to an exemplary embodiment. The acoustic meta-material AMM may be mounted directly onto a housing. The acoustic meta-material AMM would be formed from a metal that is then filled for example with a butyl rubber to prevent corrosion issues.

In summary, the invention provides an electroacoustic transducer comprising: an active element; and an acoustic coupling layer arranged to acoustically couple, in use, the active element to a transmission medium; wherein the electroacoustic transducer further comprises a cavity arranged between the active element and the acoustic coupling layer to receive a fluid; whereby acoustic coupling of the electroacoustic transducer and the transmission medium is improved. Also provided is a Tonpilz transducer comprising: an active element; and an acoustic coupling layer arranged to acoustically couple, in use, the active element to a transmission medium; wherein the acoustic coupling layer comprises an acoustic meta-material. Also provided is an array comprising a plurality of such transducers.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims and drawings), and/or all of the steps of any method or process so disclosed, may be combined in any combination, except combinations where at least some of such features and/or steps are mutually exclusive.

Each feature disclosed in this specification (including any accompanying claims, and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims and drawings), or to any novel one, or any novel combination, of the steps of any method or process so disclosed.

The invention claimed is:

1. An electroacoustic transducer for use in a liquid transmission medium, the electroacoustic transducer array comprising:
   an active element;
   an acoustic coupling layer having a porous structure and arranged to acoustically couple, in use, the active element to a liquid transmission medium external to the electroacoustic transducer; and
   wherein the active element is spaced from the acoustic coupling layer by a cavity arranged between the active element and the acoustic coupling layer, wherein in use the cavity is in fluid communication with the liquid transmission medium via the porous structure, wherein in use the cavity contains part of the liquid transmission medium, and wherein in use the liquid transmission medium provides a fluid reservoir to the cavity; and
   wherein the electroacoustic transducer has a centre frequency f in a range from 1 kHz to 80 kHz.

2. The transducer according to claim 1, wherein the acoustic coupling layer comprises an acoustic meta-material.

3. The transducer according to claim 1, wherein an acoustic impedance of the acoustic coupling layer changes in one or both of a longitudinal direction away from the cavity and a transverse direction.

4. The transducer according to claim 1, wherein a thickness of the acoustic coupling layer corresponds to either: $(2n+1)\Lambda/4$ where $\Lambda$ is the acoustic wavelength within the acoustic coupling layer, and n is either 0 or a positive integer; or $(n+1)\Lambda/2$, where $\Lambda$ is the acoustic wavelength within the acoustic coupling layer, and n is either 0 or a positive integer.

5. The transducer according to claim 1, wherein the acoustic coupling layer comprises a plurality of acoustic coupling members.

6. The transducer according to claim 1, wherein a porosity of the porous structure is in a range from about 5% to about 90% by volume of the porous structure.

7. The transducer according to claim 6, wherein the porosity changes in a longitudinal direction.

8. The transducer according to claim 1, wherein the acoustic coupling layer comprises a plurality of acoustic coupling members, wherein the plurality of acoustic coupling members taper in the longitudinal direction.

9. The transducer according to claim 1, comprising a housing having a wall arranged to surround, at least in part, the acoustic coupling layer.

10. The transducer according to claim 9, wherein the housing defines a cylindrical housing having a diameter in a range from about 1 to about 2.5 times a diameter of the active element.

11. The transducer according to claim 9, wherein a wall thickness of the wall is in a range from about 4 mm to about 10 mm.

12. The transducer according to claim 9, wherein a fill ratio of the housing by the acoustic coupling layer is in a range of from about 5% to about 90%.

13. The transducer according to claim 9, wherein a shape of the housing is arranged to support longitudinal vibration Eigen-frequency modes.

14. The transducer according to claim 1, wherein the active element comprises a single crystal piezoelectric material.

15. The transducer according to claim 1, further comprising: a layer providing a sound emitting surface and arranged between the active element and the cavity, wherein the layer is mechanically coupled to the active element and wherein the layer comprises an alloy that includes aluminum and beryllium.

16. The transducer according to claim 1, wherein a centre frequency f of the transducer is in a range from about 10 to 60 kHz.

17. The transducer according to claim 1, wherein the transducer is configured as a Tonpilz transducer.

18. The transducer according to claim 1, further comprising an encapsulant.

19. A Tonpilz transducer for use in a liquid transmission medium, the Tonpilz transducer comprising:
   an active element; and
   an acoustic coupling layer arranged to acoustically couple, in use, the active element to a liquid transmission medium external to the Tonpilz transducer, wherein the acoustic coupling layer comprises an acoustic meta-material with an array of acoustic coupling members mutually aligned in a longitudinal direction from the acoustic coupling layer and defining open pores between adjacent acoustic coupling members; and
   a cavity between the active element and the acoustic coupling layer, the cavity in fluid communication with the liquid transmission medium via the open pores, wherein in use the cavity contains part of the liquid transmission medium;
   wherein the Tonpilz transducer has a centre frequency f in a range from 1 kHz to 80 kHz.

20. An electroacoustic transducer for use in a liquid transmission medium, the electroacoustic transducer comprising:
   a housing having a hollow cylindrical geometry exending along a central axis from a first end to an open second end;
   an active element configured to generate and/or receive sound via at least one of a piezoelectric effect, an electromagnetic effect, and an electrical effect;
   an acoustic coupling layer mechanically supported by the housing and arranged to acoustically couple, in use, the active element to a liquid transmission medium external to the electroacoustic transducer;
   wherein the active element is spaced from the acoustic coupling layer along the central axis by a cavity arranged between the active element and the acoustic coupling layer, the cavity in fluid communication with the liquid transmission medium via the open second end, and in use the cavity contains part of the liquid transmissin medium;
   wherein the electroacoustic transducer has a centre frequency f in a range from 1 kHz to 80 kHz.

21. The Tonpilz transducer of claim 19, wherein the centre frequency f is from 10 kHz to 60 kHz.

22. The electroacoustic transducer of claim 20, wherein the centre frequency f is from 20 kHz to 50 kHz.

* * * * *

UNITED STATES PATENT AND TRADEMARK OFFICE
CERTIFICATE OF CORRECTION

PATENT NO. : 11,800,295 B2  
APPLICATION NO. : 16/631719  
DATED : October 24, 2023  
INVENTOR(S) : Lionel William J. Kent Page 1 of 2

It is certified that error appears in the above-identified patent and that said Letters Patent is hereby corrected as shown below:

In the Claims

Column 24, Lines 52-54 should read:
6. The transducer according to claim 1, wherein a porosity of the porous structure is in a range from 5% to 90% by volume of the porous structure.

Column 24, Lines 64-67 should read:
10. The transducer according to claim 9, wherein the housing defines a cylindrical housing having a diameter in a range from 1 to 2.5 times a diameter of the active element.

Column 25, Lines 1-3 should read:
11. The transducer according to claim 9, wherein a wall thickness of the wall is in a range from 4 mm to 10 mm.

Column 25, Lines 4-6 should read:
12. The transducer according to claim 9, wherein a fill ratio of the housing by the acoustic coupling layer is in a range of from 5% to 90%.

Column 25, Lines 18-20 should read:
16. The transducer according to claim 1, wherein the centre frequency f of the transducer is in a range from 10 to 60 kHz.

Column 25, Lines 25-35 and Column 26, Lines 1-7 should read:
19. A Tonpilz transducer for use in a liquid transmission medium, the Tonpilz transducer comprising:
an active element;
an acoustic coupling layer arranged to acoustically couple, in use, the active element to a liquid transmission medium external to the Tonpilz transducer, wherein the acoustic coupling layer comprises an acoustic meta-material with an array of acoustic coupling members mutually aligned in a longitudinal direction from the acoustic coupling layer and defining open pores between adjacent acoustic coupling members; and Signed and Sealed this  
Sixteenth Day of January, 2024

Katherine Kelly Vidal  
*Director of the United States Patent and Trademark Office* a cavity between the active element and the acoustic coupling layer, the cavity in fluid communication with the liquid transmission medium via the open pores, wherein in use the cavity contains part of the liquid transmission medium;
wherein the Tonpilz transducer has a centre frequency f in a range from 1 kHz to 80 kHz.

Column 26, Lines 9-30 should read:
20. An electroacoustic transducer for use in a liquid transmission medium, the electroacoustic transducer comprising:
a housing having a hollow cylindrical geometry extending along a central axis from a first end to an open second end;
an active element configured to generate and/or receive sound via at least one of a piezoelectric effect, an electromagnetic effect, and an electrical effect;
an acoustic coupling layer mechanically supported by the housing and arranged to acoustically couple, in use, the active element to a liquid transmission medium external to the electroacoustic transducer;
wherein the active element is spaced from the acoustic coupling layer along the central axis by a cavity arranged between the active element and the acoustic coupling layer, the cavity in fluid communication with the liquid transmission medium via the open second end, and in use the cavity contains part of the liquid transmission medium;
wherein the electroacoustic transducer has a centre frequency f in a range from 1 kHz to 80 kHz.